US011620813B2

(12) United States Patent
Gafni et al.

(10) Patent No.: US 11,620,813 B2
(45) Date of Patent: Apr. 4, 2023

(54) ELECTRONIC-DEVICE INTERACTION VIA A REMOTE USER INTERFACE

(71) Applicant: LayerJot, Inc., Menlo Park, CA (US)

(72) Inventors: Etay Gafni, Menlo Park, CA (US); Soren Harner, Palo Alto, CA (US)

(73) Assignee: LayerJot, Inc., Menlo Park, CA (US)

( * ) Notice: Subject to any disclaimer, the term of this patent is extended or adjusted under 35 U.S.C. 154(b) by 89 days.

(21) Appl. No.: 17/194,319

(22) Filed: Mar. 8, 2021

(65) Prior Publication Data
US 2021/0278908 A1 Sep. 9, 2021

Related U.S. Application Data

(60) Provisional application No. 62/987,104, filed on Mar. 9, 2020.

(51) Int. Cl.
*G06V 10/764* (2022.01)
*G06F 3/01* (2006.01)
*G06K 9/62* (2022.01)
*G06V 10/56* (2022.01)
*G06V 10/22* (2022.01)
*G06V 30/10* (2022.01)

(52) U.S. Cl.
CPC ............ *G06V 10/764* (2022.01); *G06F 3/017* (2013.01); *G06K 9/628* (2013.01); *G06K 9/6254* (2013.01); *G06K 9/6257* (2013.01); *G06V 10/225* (2022.01); *G06V 10/56* (2022.01); *G06V 30/10* (2022.01); *G06V 2201/034* (2022.01)

(58) Field of Classification Search
CPC .... G06V 10/764; G06V 10/225; G06V 10/56; G06V 30/10; G06V 2201/034; G06F 3/017; G06K 9/6254; G06K 9/6257; G06K 9/628
See application file for complete search history.

(56) References Cited

U.S. PATENT DOCUMENTS 9,158,389 B1 10/2015 Sharma et al.
2017/0351917 A1* 12/2017 Son ...................... G06V 10/235
(Continued)

OTHER PUBLICATIONS

International Search Report and Written Opinion, PCT/US2021/21367, dated Jun. 3, 2021.

*Primary Examiner* — Casey L Kretzer
(74) *Attorney, Agent, or Firm* — Steven Stupp

(57) ABSTRACT

When an object is detected by an electronic device in a predefined spatial region of a physical mat, the electronic device may perform one or more measurements of the object using the one or more sensors. Note that the physical mat may be on a surface that is separate from the electronic device. Then, the electronic device may identify the object based at least in part on the one or more measurements, where the identification involves a pretrained neural network or a pretrained machine-learning model that uses the one or more measurements as an input and that outputs information specifying the identified object. Moreover, the electronic device may provide classification information associated with the identified object. Next, the electronic device may perform analysis associated with the identified object. For example, the electronic device may increment a count of a number of a type of object that includes the identified object.

20 Claims, 13 Drawing Sheets

(56) References Cited

U.S. PATENT DOCUMENTS

| | | |
|---|---|---|
| 2019/0130188 A1* | 5/2019 | Zhou .................... G06V 20/46 |
| 2019/0239961 A1 | 8/2019 | Birenbaum et al. |
| 2019/0302879 A1 | 10/2019 | Schwarz et al. |

* cited by examiner

ELECTRONIC-DEVICE INTERACTION VIA A REMOTE USER INTERFACE

CROSS REFERENCE TO RELATED APPLICATIONS

This application claims priority under 35 U.S.C. 119(e) to U.S. Provisional Application Ser. No. 62/987,104, entitled "Spatial Tasks Platform," by Etay Gafni, et al., filed on Mar. 9, 2020, the contents of both of which are herein incorporated by reference.

BACKGROUND

Field

The described embodiments relate to techniques for dynamically interacting with an electronic device via a user interface that is displayed on a remote or separate surface from the electronic device.

Related Art

Advances in user-interface design have made it easier for users to interact with electronic devices. For example, leveraging touch-screen displays and virtual icons in user interfaces, so-called smart phones have become ubiquitous.

However, in many applications interacting with a user interface presented on a physical display may be difficult if not impossible. For example, it can be cumbersome for medical professionals, such as surgeons, to physically interact with electronic devices. Moreover, even if the interaction is remote (such as virtual haptic interaction using, e.g., optical or radar signals, voice commands, etc.), the need for sterile conditions during surgery often restricts the use of arbitrary electronic devices, and requires equipment that can withstand autoclaving or sterilization procedures. Alternatively, in nonsterile environments, such as during the maintenance of complicated equipment, mechanics and service personal often do not have an extra hand to hold onto and interact with the user interfaces on smartphones.

SUMMARY

An electronic device that interacts with a user is described. This electronic device includes: an interface circuit that communicates with a computer; one or more sensors that perform measurements in an external environment of the electronic device; a processor; and memory that stores program instructions, where, when executed by the processor, the program instructions cause the electronic device to perform operations. Notably, when an object is detected in a predefined spatial region of a physical mat, the electronic device performs one or more measurements using the one or more sensors, where the physical mat is disposed on a surface that is separate from the electronic device. Then, the electronic device identifies the object based at least in part on the one or more measurements, where the identification involves a pretrained neural network or a pretrained machine-learning model that uses the one or more measurements as an input and that outputs information specifying the identified object. Moreover, the electronic device provides classification information associated with the identified object. Next, the electronic device performs analysis associated with the identified object.

Moreover, the one or more sensors may include one or more image sensors, and the one or more measurements may include one or more images.

Furthermore, the predefined spatial region may be specified by multiple predefined markers on the physical mat. In some embodiments, a given image in the one or more images includes information associated with at least three of the predefined markers.

Note that a given predefined marker may have a unique spatial pattern relative to remaining predefined markers on the physical mat. In some embodiments, the predefined markers may be visible. Alternatively, the predefined markers may reflect light in a band of frequencies that is different from a visible band of frequencies, such as the infrared or ultraviolet band of frequencies. Additionally, the predefined markers may provide a color reference in different lighting conditions.

Moreover, identification of the object may involve the use of image analysis. This image analysis may be performed by the electronic device and/or the computer (which may be remotely located). For example, the electronic device may provide the one or more images to the computer using the interface circuit. In response, the electronic device may receive information specifying the identified object from the computer using the interface circuit.

Furthermore, the electronic device may determine two or more predefined objects that are potential matches for the identified object, and may provide information specifying the two or more predefined objects. The electronic device may perform an additional measurement that detects that the user touched, pointed to or covered up without physical contact one or more of a set of predefined icons in a second predefined spatial region of the physical mat to select one of the two or more predefined objects, where a given predefined icon is associated with a given command or instruction.

Additionally, the analysis may include: incrementing a count of a number of a type of object that includes the object; determining a state of the object (such as open or closed, clean or dirty, etc.); computing an orientation or a spatial arrangement of the object relative to one or more other objects in the predefined spatial region; and/or calculating a numerical value associated with the object.

Note that the object may include a surgical instrument.

Moreover, the one or more measurements may capture a gesture of the user that specifies at least a portion of the object. For example, the gesture may involve two fingers on one or both hands of the user. In response to detecting the gesture, the electronic device may perform at least a measurement on at least the specified portion of the object (such as acquiring an image). In some embodiments, the electronic device performs optical character recognition on at least the specified portion of the object.

Furthermore, when the electronic device detects a second object in a second predefined spatial region of the physical mat, the electronic device may: perform one or more second measurements using the one or more sensors; identify the second object based at least in part on the one or more second measurements; and perform analysis associated with the identified second object. For example, the object in the predefined spatial region may be an available surgical instrument, the second object in the second predefined spatial region may be a used (or unavailable) surgical instrument, and the analysis may include maintaining a count of available and/or used surgical instruments, e.g., during a surgical procedure.

Additionally, the electronic device may provide and/or store a report with results of the analysis.

Another embodiment provides the computer.

Another embodiment provides the physical mat.

Another embodiment provides a computer-readable storage medium that stores program instructions for use with the electronic device or the computer. When executed by the electronic device or the computer, the program instructions cause the electronic device or the computer to perform at least some of the aforementioned operations.

Another embodiment provides a method, which may be performed by the electronic device or the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
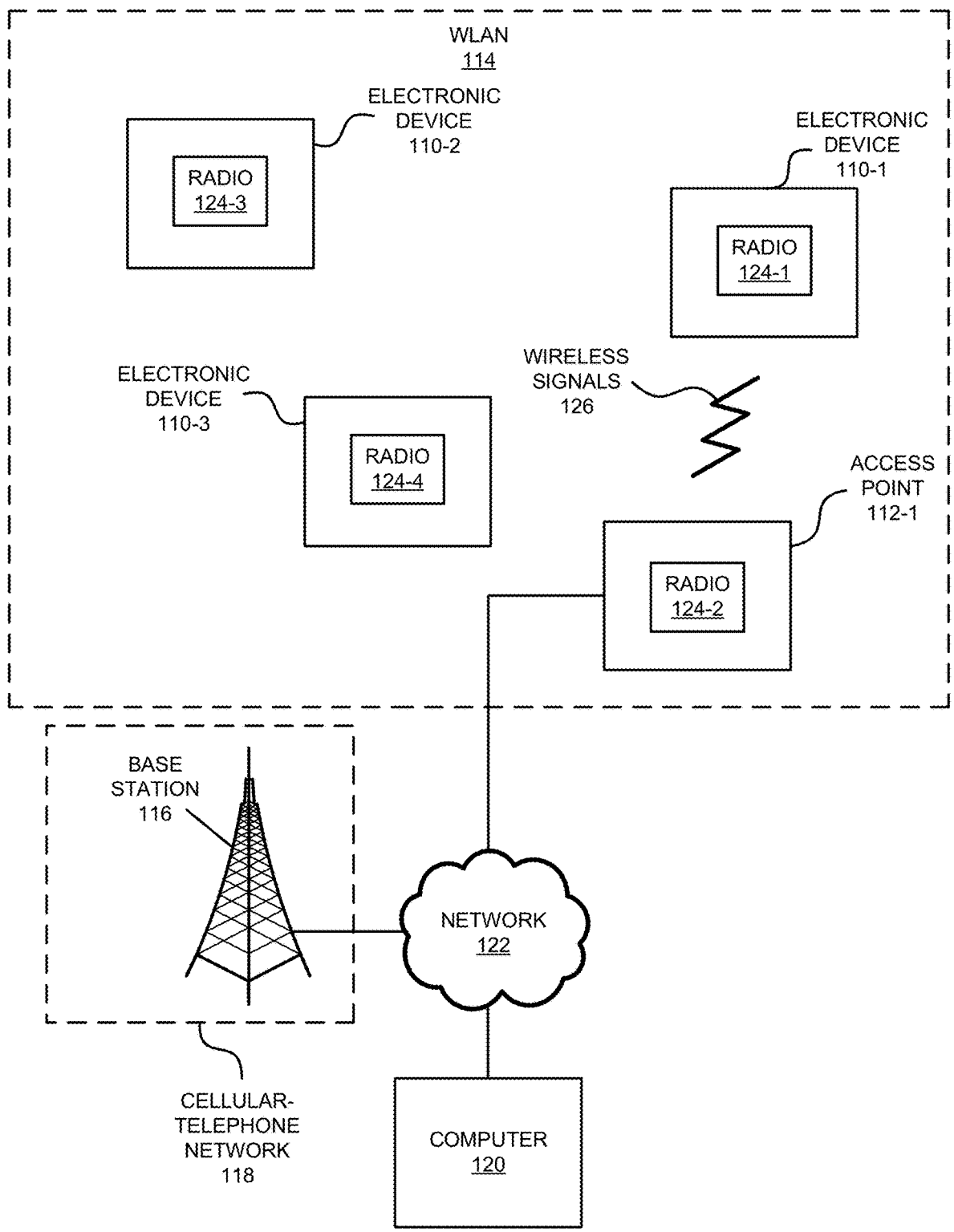
FIG. 1 is a block diagram illustrating an example of communication among an electronic device and a computer in accordance with an embodiment of the present disclosure.

An electronic device that interacts with a user is described. When an object (such as a surgical instrument) is detected by the electronic device in a predefined spatial region of a physical mat, the electronic device may perform one or more measurements of the object using the one or more sensors. Note that the physical mat is disposed on a surface that is separate from the electronic device. Then, the electronic device may identify the object based at least in part on the one or more measurements, where the identification involves a pretrained neural network or a pretrained machine-learning model that uses the one or more measurements as an input and that outputs information specifying the identified object. Moreover, the electronic device may provide classification information associated with the identified object (e.g., on a display). Next, the electronic device may perform analysis associated with the identified object. For example, the electronic device may: increment a count of a number of a type of object that includes the identified object; determine a state of the object (such as open or closed, clean or dirty, etc.); compute an orientation or a spatial arrangement of the object relative to one or more other objects in the predefined spatial region; and/or calculate a numerical value associated with the object.

By performing these operations, these user-interface techniques may allow a user to remotely interact with an electronic device or an application executing on the electronic device. Notably, the user-interface techniques may allow the user to intuitively interact with the electronic device or the application without physical contact with a surface of the electronic device or without requiring the use of a voice-recognition-based user interface. Moreover, the user-interface techniques may provide structure for the interaction (such as a physical mat with a predefined spatial arrangement of predefined markers) in order to simplify the interaction and to increase the accuracy of image processing (such as object recognition and/or optical character recognition) in a wide variety of environments and/or lighting conditions. In these ways, the user-interface techniques may provide hands-free interaction or control of the electronic device or the application using an arbitrary and convenient surface. These additional degrees of freedom may allow the user to harness the advantages of the electronic device or the application (such as access to information and increased efficiency or productivity) in environments where it may otherwise be difficult to do so (such as during surgery, repair or maintenance of complicated machinery, or operation of complicated devices, e.g., an aircraft, a train, a bus, a car, etc.).

In the discussion that follows, one or more electronic devices communicate packets or frames in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node or a base station in a network may communicate with a local or remotely located computer using a wired communication protocol, such as a wired communication protocol that is compatible with an IEEE 802.3 standard (which is sometimes referred to as 'Ethernet'), e.g., an Ethernet II standard. However, a wide variety of communication protocols may be used, including wired and/or wireless communication. In the discussion that follows, Wi-Fi or a cellular-telephone communication protocol, and Ethernet are used as illustrative examples.

FIG. 1 presents a block diagram illustrating an example of communication among one or more electronic devices 110 (such as a cellular telephone), an access point 112 in a wireless local area network (WLAN) 114, a base station 116 in a cellular-telephone network 118, and a computer 120 (or a group of computers). Notably, electronic devices 110 may communicate with access point 112 and/or base station 116 using wireless communication. Moreover, access point 112 and/or base station 116 may provide access to a network 122 (such as the Internet, a cable network, etc.) that is external to WLAN 114 or cellular-telephone network 114. Note that access point 112 may include a physical access point and/or a virtual access point that is implemented in software that executes in an operating system of an electronic device or a computer.

Access point 112 may communicate with network 122 and/or base station 116 may communicate with cellular-telephone network 118 and/or network 122 using wired communication, wireless communication or both. This wired or wireless communication may occur via an intra-net, a mesh network, point-to-point connections and/or the Internet and may use a network communication protocol, such as Ethernet. This network may include one or more routers and/or switches (not shown). Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication with access point 112 also involves the use of dedicated connections, such as via a peer-to-peer (P2P) communication technique.

Figure 13:
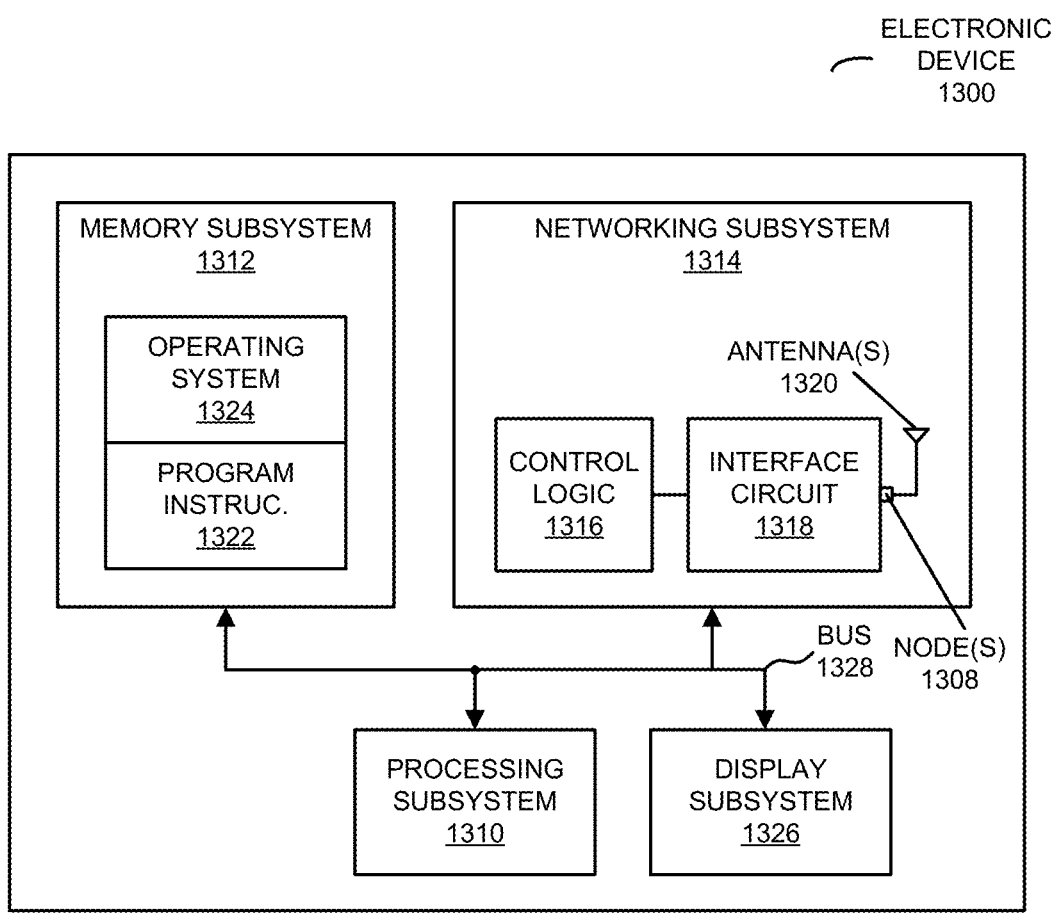
FIG. 13 is a block diagram illustrating an electronic device in accordance with an embodiment of the present disclosure.

As described further below with reference to FIG. 13, electronic devices 110, access point 112, base station 116 and/or computer 120 may include subsystems, such as a networking subsystem, a memory subsystem and a processor subsystem. In addition, electronic devices 110, access point 112 and/or base station 116 may include radios 124 in the networking subsystems. More generally, electronic devices 110 and access point 112 can include (or can be included within) any electronic devices with the networking subsystems that enable electronic devices 110 and access point 112 to communicate using wireless and/or wired communication. This wireless communication can comprise transmitting advertisements on wireless channels to enable electronic devices 110 and access point 112 to make initial contact or detect each other, followed by exchanging subsequent data/management packets or frames (such as association requests and responses) to establish a connection, configure security options (e.g., Internet Protocol Security), transmit and receive packets or frames via the connection, etc. Note that while instances of radios 124 are shown in electronic devices 110, access point 112 and base station 116, one or more of these instances may be different from the other instances of radios 124.

As can be seen in FIG. 1, wireless signals 126 (represented by a jagged line) are transmitted from radio 124-1 in electronic device 110-1. These wireless signals may be received by radio 124-2 in access point 112. Notably, electronic device 110-1 may transmit packets or frames. In turn, these packets or frames may be received by access point 112. Moreover, access point 112 may allow electronic device 110-1 to communicate with other electronic devices, computers and/or servers via network 122.

Note that the communication among electronic devices 110, access point 112 and/or base station 116 may be characterized by a variety of performance metrics (which are sometimes referred to as 'communication performance metrics'), such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments, processing a packet or frame in electronic devices 110, access point 112, and/or base station 116 may include: receiving signals (such as wireless signals 126) with the packet or frame; decoding/extracting the packet or frame from received wireless signals 126 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, in many applications interacting with a user interface presented on a physical display may be inconvenient or difficult, if not impossible. As described further below with reference to FIGS. 2-12, in order to address these problems an electronic device (such as electronic device 110-1) may perform the user-interface techniques to allow a user of electronic device 110-1 to remotely interact with electronic device 110-1 or an application executed on electronic device 110-1 (such as in an environment provided by an operating system on electronic device 110-1).

During the user-interface techniques, electronic device 110-1 may execute program instructions or software (which is sometimes referred to as an 'augmented reality application') that performs one or more operations. Note that the program instructions may be a standalone executable that is installed on electronic device 110-1 an executed in an environment of electronic device 110-10 (such as by an operating system on electronic device 110-1). Alternatively or additionally, program instructions may be executed in the environment of a Web browser, such as: a Web-browser plugin, a Web application, a native application leveraging one or more application programming interfaces, and/or a standalone embedded application. In some embodiments, at least a portion of the functionality associated with the user-interface techniques is implemented using a client-server architecture, e.g., by computer 120 via WLAN 114, cellular-telephone network 116 and/or network 122). Note that the program instructions may include configuration instructions for a preinstalled augmented reality application or container on electronic device 110-1. These configuration instructions may be provided to electronic device 110-1, and may tailor or customize the preinstalled augmented reality application or container, so that, when executed, it performs the operations associated with the augmented reality application.

Notably, during the user-interface techniques, electronic device 110-1 may be used in conjunction with a physical mat that is disposed on a remote or a separate surface from electronic device 110-1 in an environment that includes electronic device 110-1. Electronic device 110-1 may monitor one or more predefined spatial regions on the physical mat, such as an object-assessment region or predefined icons associated with particular commands or instructions for electronic device 110-1. This monitoring may involve performing one or more measurements using one or more sensors in electronic device 110-1, such as: one or more image sensors (e.g., a periscope camera), one or more microphones or acoustic sensors (which may record sound or speech), one or more time-of-flight sensors, one or more radar sensors, one or more ultrasound sensors, one or more temperature sensors, and/or another type of non-invasive or non-contact measurement sensor. Note that the one or more measurements may include transmitting and/or receiving signals. Moreover, during the user-interface techniques, electronic device 110-1 may dynamically display information on a display, such as instructions, identified objects, etc., and the displayed information may be modified based at least in part on instructions or commands that are specified by a user via the physical mat.

For example, electronic device 110-1 may acquire one or more images of one or more objects in a predefined object-assessment region on a physical mat, e.g., using one or more image sensors (such as one or more CMOS or CCD image sensors). Electronic device 110-1 may automatically acquire the one or more images when at least an object is detected within a field of view of the one or more image sensors (such as in the predefined object-assessment region). For example, as illustrated in FIGS. 6-9, the user may place at least the object in the predefined object-assessment region of the physical mat in response to instructions that are displayed on electronic device 110-1 (or on an external display that is associated with electronic device 110-). Alternatively, the user may initiate the acquisition of the one or more images by providing an object-acquisition instruction, such as a voice command or a gesture that is detected by electronic device 110-1 using a voice recognition technique and/or a gesture recognition technique. Note that the one or more images may include: a single image, video (or a temporal or a spatial sequence of images), complex information (phase and amplitude), depth information (such as a depth image), color (according to a color space, such as RGB, a color space extending outside the visual spectrum, etc.), an amount or an intensity of light (such as from a light meter), information in one or more bands of frequencies or wavelengths, such as: an infrared band, a visible band, an ultraviolet band, etc.

Moreover, one or more objects of interest in the one or more images may be identified using image analysis. For example, the one or more objects may be identified using a pretrained neural network (such as convolutional neural network) and/or a pretrained machine-learning model (such as a supervised-learning model or an unsupervised-learning model, e.g., support vector machines, classification and regression trees, logistic regression, LASSO, linear regression and/or another linear or nonlinear machine-learning model). Moreover, the machine-learning model may include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), simultaneous locations and mapping (SLAM), etc. In some embodiments, the image analysis includes a Kalman or Bayes filter technique, which may build a state model over previous frames, such that the classification and analysis of one or more objects in a scene or the field of view is updated over multiple images in a sequence. SLAM may be used to localize the camera in the world. Thus, in the user-interface techniques, SLAM may be generalized and combined with classification-based methods using, e.g., Bayesian inference. In these embodiments, the user-interface techniques may use: an inertial measurement (e.g., from an accelerometer and/or a gyroscope) to help determine the scale of one or more objects; and/or a light sensor to determine an illumination level to assist with light-balances or to determine a color or a type of material. In some embodiments, the physical mat includes one or more predefined markers that provide a color reference even when the lighting (such as the illumination level or intensity, direction, etc.) in the environment varies or changes. Note that the image analysis may be performed locally on electronic device 110-1 (e.g., electronic device may identify the one or more objects) and/or remotely by computer 120 based on communication via network 122 (e.g., electronic device 110-1 may provide an image to computer 120 and may receive information that specifies the one or more objects or object information from the computer 120).

In some embodiments, a given object is identified using a pretrained predictive model (such as a supervised machine-learning model or a neural network) that performs classification (what type of object is the given object). Alternatively or additionally, the identification operation may be performed using a search technique. For example, a user may provide at least an image of an object and the identification may involve a similarity match with a corpus or a dataset of information associated with predefined objects. The image of the object may be analyzed (e.g., using image analysis) to create a condensed or semantically meaningful set of features associated with the object, which are then compared to the corpus of the dataset to identify one or more potential matches. Notably, a pretrained neural network may analyze the image to provide a vector of numerical values for different features (such as 512 features) that represent an overall appearance of the object (which is sometimes referred to as 'embedding features'). In addition, one or more image-analysis or image-processing techniques may be used to extract additional features associated with the object, including one or more of: a true or absolute size of the object, identification of a tip of the object, identification of one or more loops in the object, information that specifies a topology of the object, one or more moments of the object, an area of the object, and/or another type of feature. In some embodiments, the pretrained neural network is applied to one or more sub-portions of the image to generate one or more additional vectors of embedded features. Then, a dimensional reduction technique may be applied to the vector, the one or more additional vectors and/or the extracted features. For example, the dimensional reduction technique may include: principle component analysis (PCA), singular value decomposition (SVD), t-distributed stochastic neighbor embedding or t-SNE (in which the relative distance between features is maintained in a lower-dimensional space as in a higher-dimensional space), and/or another dimensional reduction technique. Next, a search over similar representation of predefined objects in the corpus of the dataset is performed to identify potential matches. For example, the search may use one or more of: cosine similarity (or an inner dot product), a weighted summation of Euclidean distance, etc. When multiple potential matches are identified, a probabilistic comparison of distribution-based features of the potential matches with the information associated with the image may be performed to identify the object.

Note that the identification process may provide speed, accuracy and scale. For example, the identification process may be able to identify matches from a corpus or a dataset of 30,000-100,000 medical instruments. In some embodiments, a new object (such as a new medical instrument) may be added to the corpus or the dataset by providing 10 images of the new object (i.e., the 10 images may provide sufficient information for the new object to be rapidly and accurate identified in the future using the aforementioned identification process or techniques).

Figure 4:
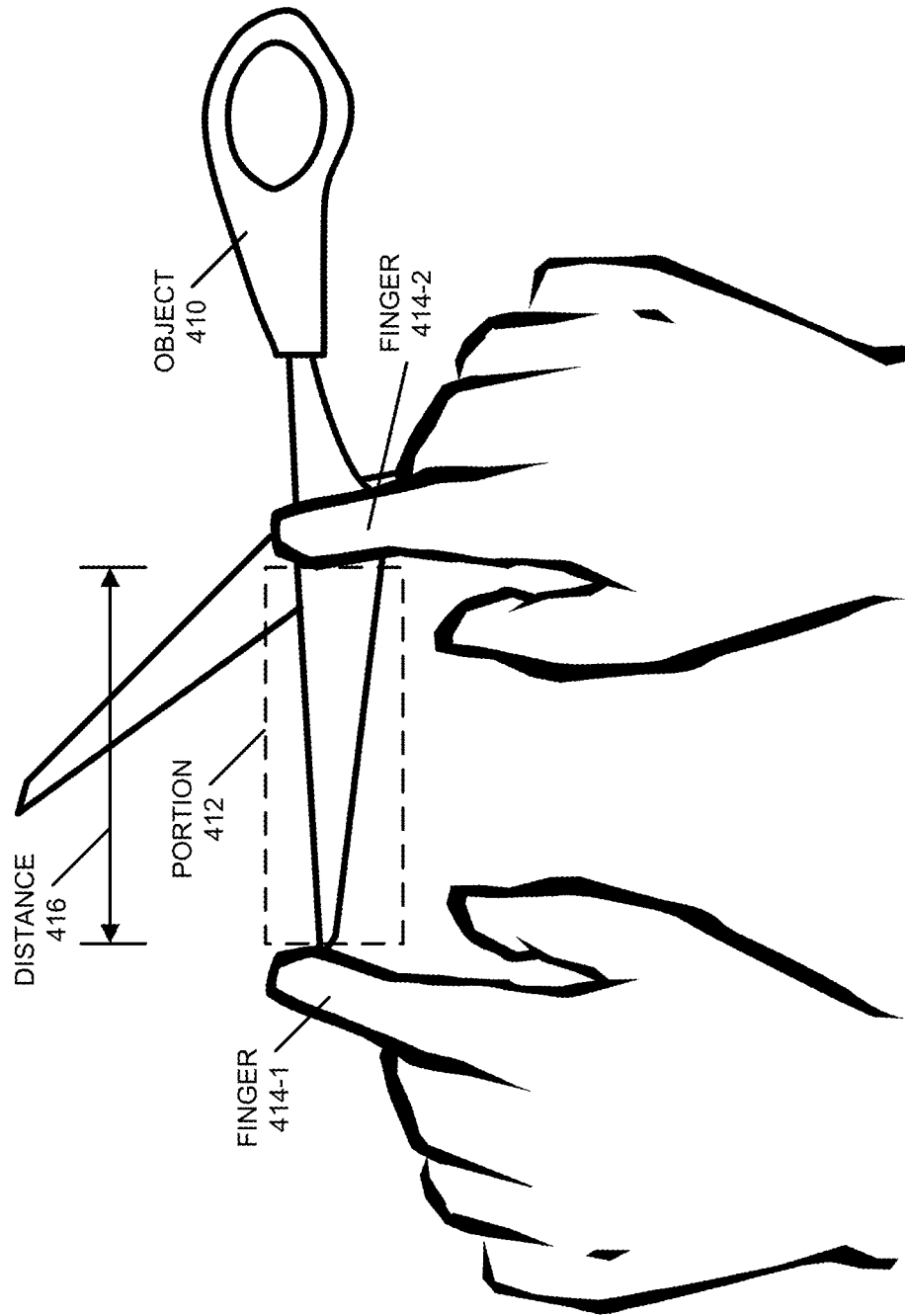
FIG. 4 is a drawing illustrating an example of gesture-based capture of an image of at least a portion of an object in accordance with an embodiment of the present disclosure.
Figure 5:
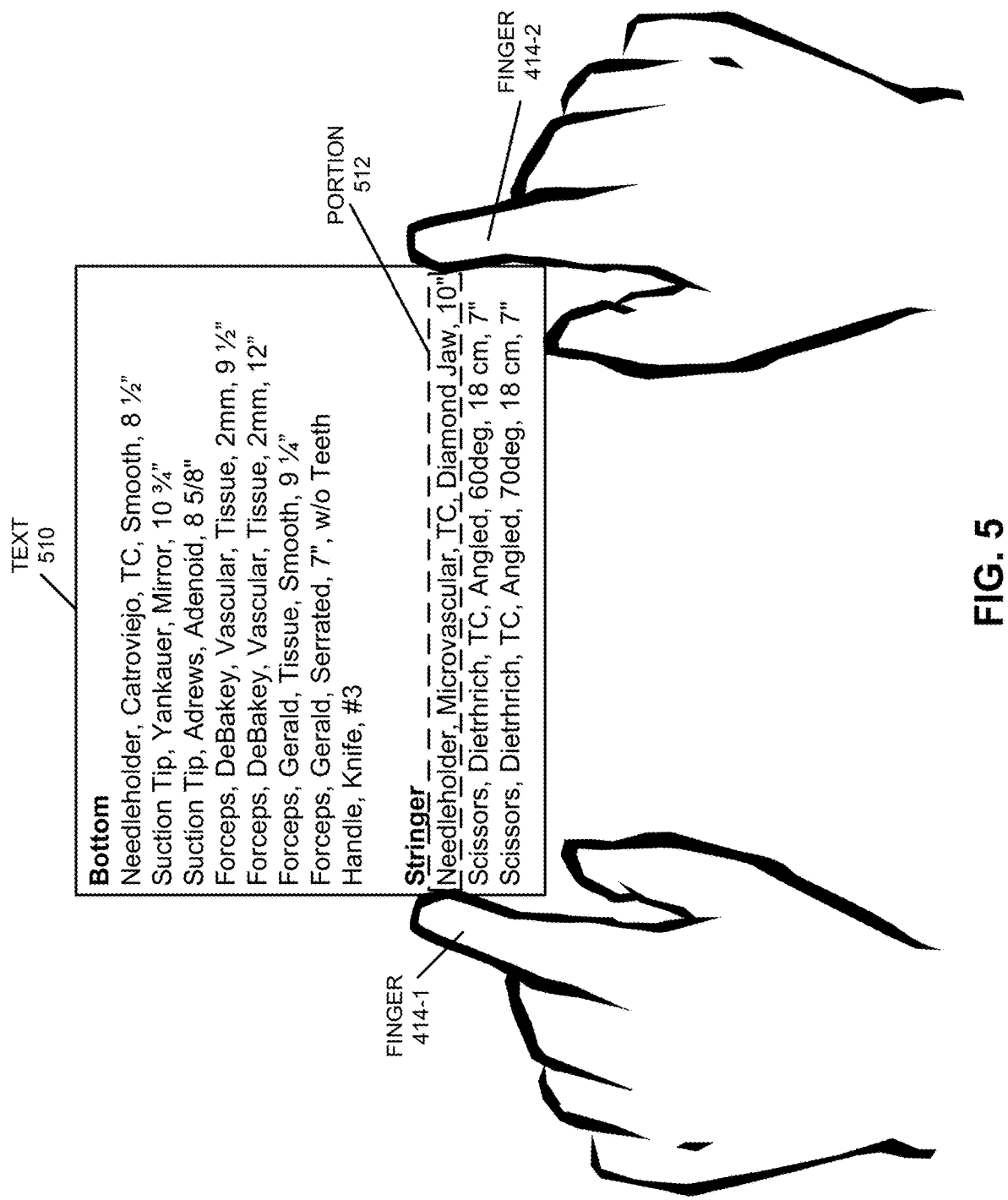
FIG. 5 is a drawing illustrating an example of gesture-based capture of an image of at least a portion of an object in accordance with an embodiment of the present disclosure.

Alternatively or additionally, as described further below with reference to FIGS. 4 and 5, in some embodiments the user may specify at least a portion or a region of an object that is of interest. For example, the user may make a gesture (such as using two fingers on the same or different hands) in proximity to the object to specify the portion or the region of the object. Then, electronic device 110-1 may acquire one or more images of the specified portion or region of the object. In some embodiments, electronic device 110-1 and/or computer 120 may perform optical character recognition and/or image analysis on the specified portion or region of the object.

Figure 10:
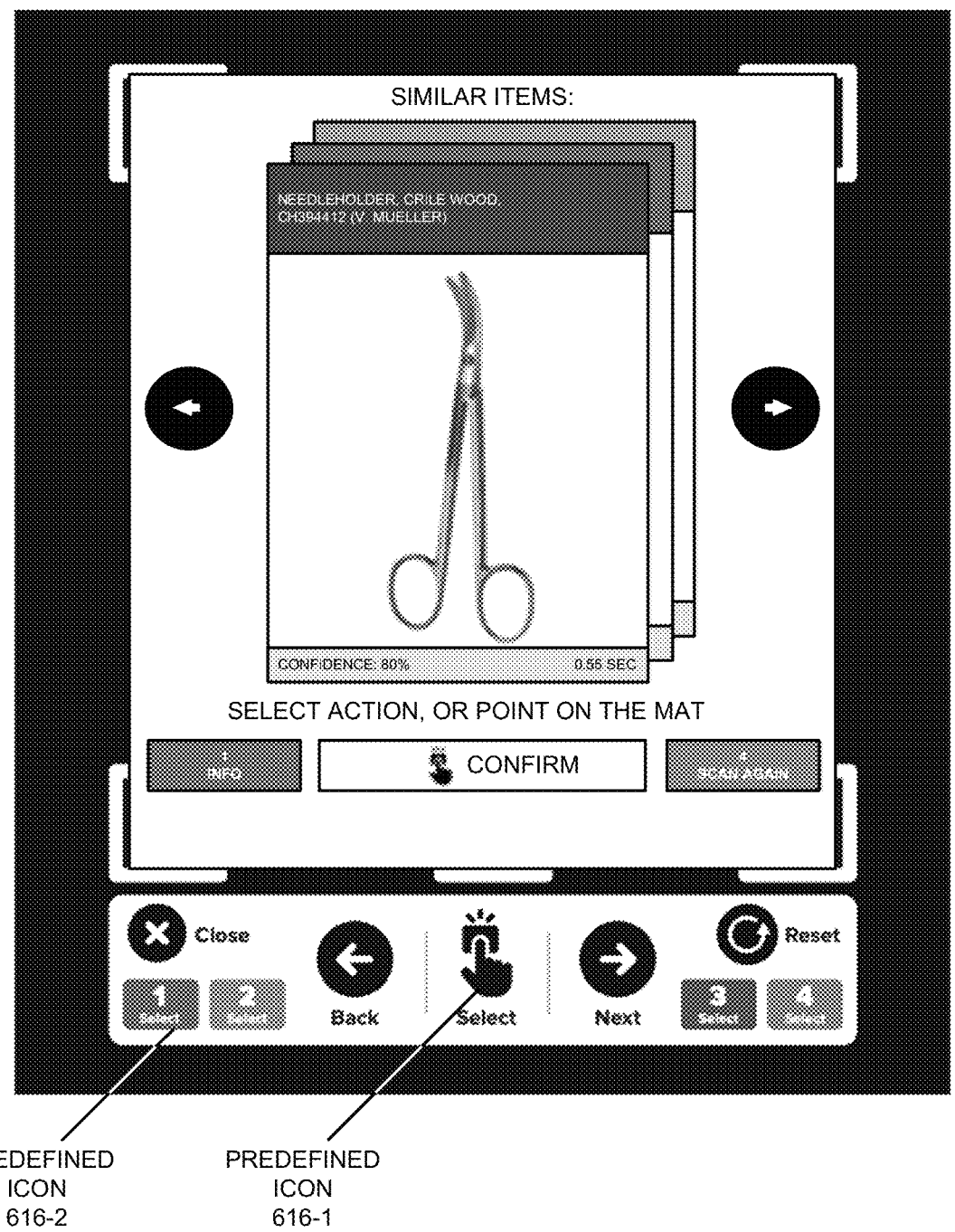
FIG. 10 is a drawing illustrating an example of displayed information on an electronic device corresponding to user interaction with a companion application on the electronic device in FIG. 1 via a physical mat in accordance with an embodiment of the present disclosure.
Figure 11:
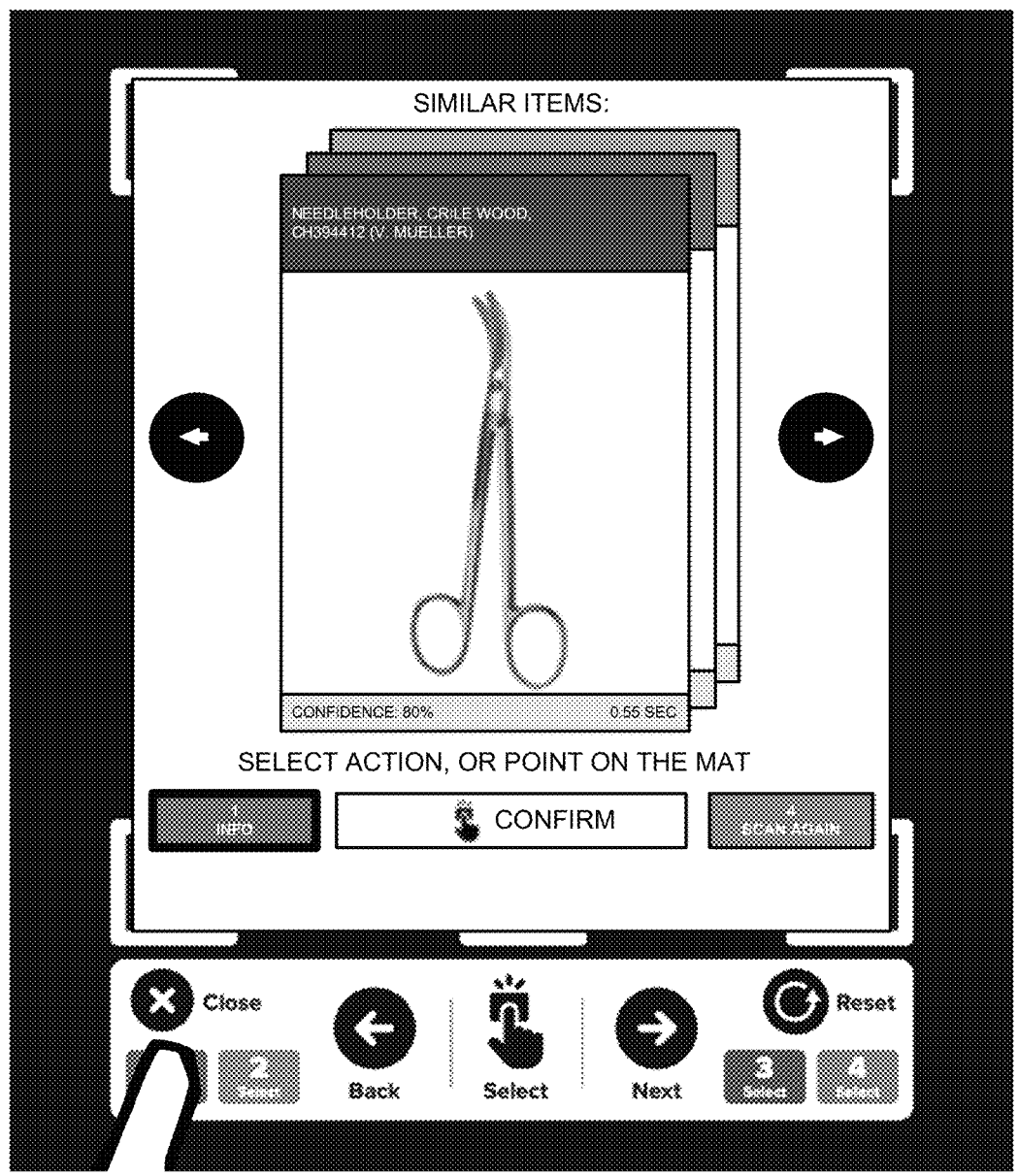
FIG. 11 is a drawing illustrating an example of displayed information on an electronic device corresponding to user interaction with a companion application on the electronic device in FIG. 1 via a physical mat in accordance with an embodiment of the present disclosure.
Figure 12:
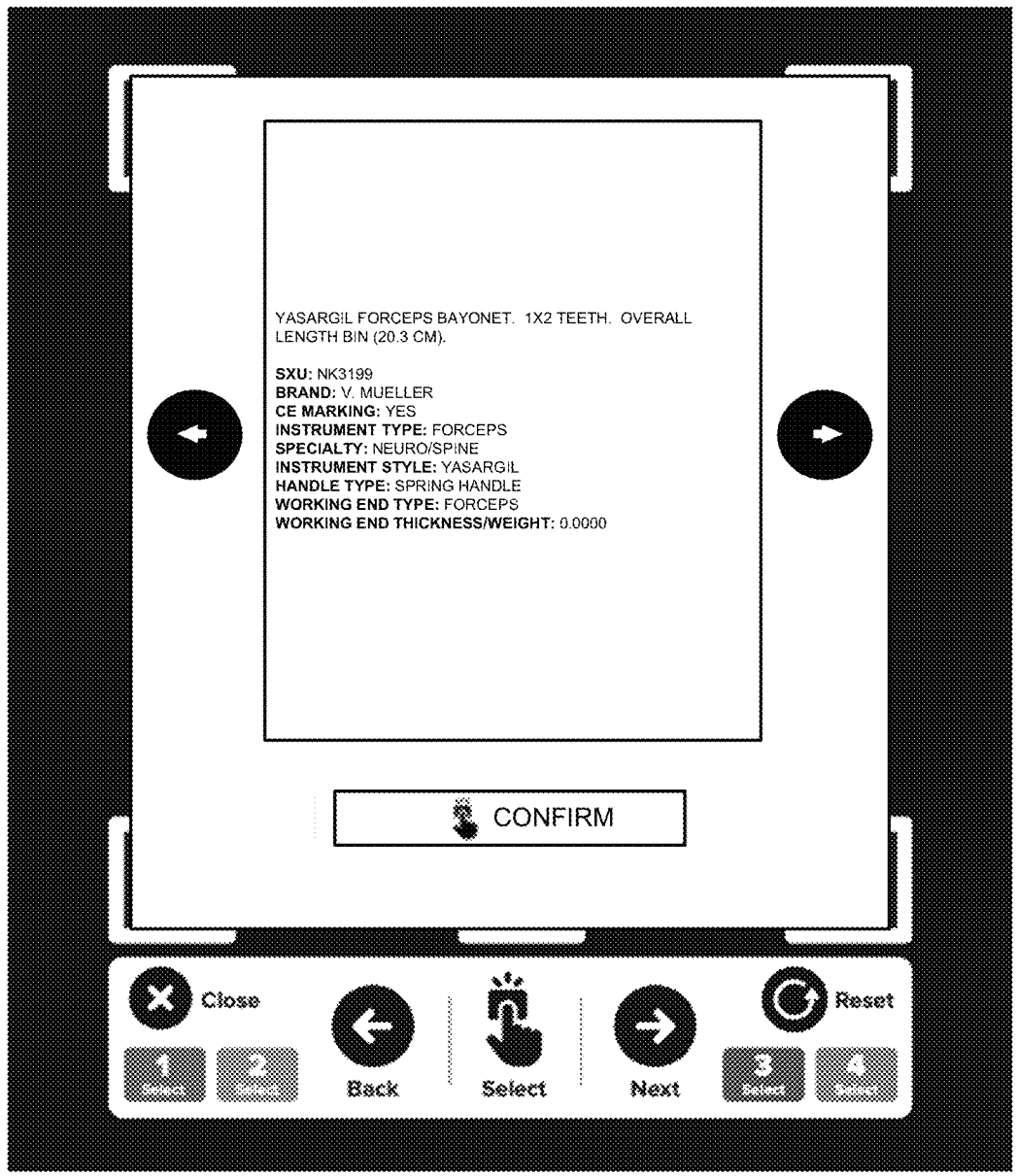
FIG. 12 is a drawing illustrating an example of displayed information on an electronic device corresponding to user interaction with a companion application on the electronic device in FIG. 1 via a physical mat in accordance with an embodiment of the present disclosure.

After the one or more objects are identified, electronic device 110-1 may display or provide information that specifies the one or more objects (such as a border or a frame around an identified object). In some embodiments, the user may provide information to electronic device 110-1 that confirms and/or modifies the identified one or more objects. For example, as illustrated in FIGS. 10-12, when more than one potential match is identified for a given object, the user may touch, point to or cover up without physical contact one or more predefined icons on the physical mat. The one or more predefined icons may specify commands or instructions (such as 'forward' or 'back' through a list of potential matches or possible identified objects) that allow the user to navigate through and/or select an identified object from multiple potential identified objects that may match the given object.

Moreover, after the one or more objects are identified, electronic device 110-1 may display or provide classification information and/or metadata associated with the one or more identified objects. Notably, the classification information and/or the metadata associated with a given object may include: a name (e.g., of a surgical instrument or a tool), a category, a color, a material, heads or tails, a denomination or numerical value, a relative measurement or dimension (or an absolute measurement or dimension if scale is specified or recovered), a shape, a topological relationship (e.g., a locked padlock), a geometric arrangement, an open or closed state (such as an off-state for a switch), an ordering, etc. For example, a name or category for a quarter or another type of monetary instrument may include a coin, a currency or an object; a name or category may include a surgical instrument; a shape may include a sphere, a cube, a prism, a cone, a disk, a square (or flat object), etc.; a color may include a solid color (such as blue, red, green, purple, etc.), a multi-colored pattern, a color temperature, etc.; a material may include metal, plastic, wood, etc.; relative information for an object may be relative to the surface it lies on; relative information for multiple objects may include that the sphere is to the left of the cube, the quarter is in front of the nickel, the red block is above the blue block, a bicycle lock attaches a bicycle to a pole, etc.; states such as open or closed for scissors or clamps; a geometric arrangement of objects and orders may include buttons in a line, an l-shaped formation, a sequence of objects from left to right; subcomponents of an object, such as the blades or handles of scissors; the results of operations such as finding objects, counting objects, localizing the position of an object in a three-dimensional (3D) coordinate system, etc.

If the given object is new (e.g., it has not previously been encountered before by electronic device 110-1 or computer 120), electronic device 110-1 may display one or more queries or questions for classification information and/or metadata associated with the identified given object. In response, the user may provide the classification information and/or the metadata for the given object to electronic device 110-1. For example, the user may provide the classifications using a user interface (such as a keyboard, a touch pad, a touch-sensitive display, another human-interface device, etc.) and/or a voice-recognition user interface. In some embodiments, the user may provide inputs to electronic device 110-1 during at least a portion of the user-interface techniques using a human-electronic device interface.

In some embodiments, electronic device 110-1 may provide or display a recommended classification for a given object (such as using a set of predefined or predetermined classifications, i.e., classifications that electronic device 110-1 and/or computer 120 can recognize), and the received classifications for a given object may be based at least in part on a recommended classification. Notably, the user may accept or revise a recommended classification. Note that electronic device 110-1 and/or computer 120 may determine the recommended classification(s) using the same or a second pretrained neural network and/or pretrained machine-learning model (such as a supervised-learning model or an unsupervised-learning model). In some embodiments, the given object may be identified (and a recommended classification may be specified) using radio-frequency identification, a barcode, a Quick Response (QR) code, a fiduciary markers, text or logos on packaging, etc.

In general, information acquired about the one or more objects (such as the one or more images) may be analyzed or assessed by electronic device 110-1 and/or computer 120 using one or more scene analysis models in order to tune and optimize a scene-analysis model to characteristics of electronic device 110-1, such as the target hardware. This may include training smaller models for less powerful hardware, quantizing models, pruning models, etc., depending on the type of electronic device and its capabilities (such as whether the one or more images sensors are capable of acquiring 3D or depth information, images outside of the visible band of frequencies, e.g., in an infrared band of frequencies, etc.).

Moreover, one or more inspection criteria associated with at least the subset of the one or more objects may be used by electronic device 110-1 and/or computer 120 to analyze of assess the one or more objects. In some embodiments, the user may have previously provided or specified the one or more inspection criteria to electronic device 110-1 and/or computer 120. Alternatively, in some embodiments, electronic device 110-1 and/or computer 120 may determine the one or more inspection criterion based at least in part on analysis of a context (or visual context) of at least the subset of the objects in the one or more images. Note that the user may approve or modify (such as provide a revision to) the determined one or more inspection criteria. In general, the analysis of the context, and thus the determination of the one or more inspection criteria, may be performed locally on electronic device 110-1 and/or remotely by computer 120 based on communication via network 122. Furthermore, electronic device 110-1 (and/or computer 120) may determine the one or more inspection criteria and/or may perform the analysis of the context using the same or a third pretrained neural network and/or pretrained machine-learning model (such as a supervised-learning model or an unsupervised-learning model).

In some embodiments, the one or more inspection criteria may be determined based at least in part on questions associated with at least the subset of the one or more objects that are provided (e.g., displayed) by electronic device 110-1 to the user, and answers associated with the one or more questions that are received from the user. Note that the received answers may include a revision to at least one of the one or more inspection criteria that are determined by electronic device 110-1 and/or computer 120. For example, electronic device 110-1 may perform natural language processing and semantic parsing (and, more generally, semantic reasoning) to determine the one or more inspection criteria from the answers. Alternatively, as noted previously, even in embodiments where electronic device 110-1 does not provide questions, electronic device 110-1 may receive a revision from the user to at least one of the one or more inspection criteria, which may have been determined by electronic device 110-1 and/or computer 120.

Note that the one or more inspection criteria may correspond to one or more attributes or characteristics of the objects in at least the subset, which may correspond to the context. For example, the one or more attributes or the context may include one or more of: a spatial arrangement (or intra-relationships or interrelationships, i.e., between objects in an image or within an object) of the objects in the subset, an order of the objects in the subset, a pattern corresponding to the objects in the subset, a number of the objects in the subset, one or more numerical values corresponding to the objects in the subset, an orientation of the objects in the subset, a material of the objects in the subset (such as plastic or metal), a shape of the objects in the subset (such as a ball, a sphere, a cube, etc.), a value of the one or more objects in the subset, measurements relative to a physical or a virtual coordinate system, a temporal relationship among the objects in the subset, or states or actions associated with the objects in the subset (such as a clean or dirty, open or closed, etc.). Thus, the one or more attributes may include a color and/or a number of the one or more objects, and the one or more inspection criteria may be, e.g., that "a yellow brick should occur 5 times." More generally, the one or more inspection criteria may include business logic to apply to a given image, such as: patterns, colors, size, a shaped inspection region (e.g., a line, a box, an 1-shaped region, etc.), a value (such as a monetary value, head or tails, a number on the surface of a die, etc.), a scratch, damage, contamination, etc.

Thus, during the user-interface techniques, electronic device 110-1 and/or computer 120 may acquire one or more images (and, more generally, one or more measurements); identify one or more objects; and/or analyze the one or more objects (such as based at least in part on classification information, metadata and/or one or more inspection criteria). For example, electronic device 110-1 and/or computer 120 may: identify any instances of one or more objects in one or more images (e.g., using image analysis or deep learning); and/or analyze the one or more objects based at least in part on one or more inspection criteria (which may involve object recognition, tagging or labeling and/or counting). In some embodiments, electronic device 110-1 may display, store and/or provide a report summarizing the results of the analysis. In general, one or more of the operations associated with the user-interface techniques may be performed locally on electronic device 110-1 and/or remotely on computer 120 via network 122. For example, image analysis of the one or more images may be performed remotely by computer 120, the one or more inspection criteria may be assessed remotely by computer 120 and/or the report summarizing the results may be stored or disseminated to recipients remotely by computer 120.

While the preceding embodiments illustrated the user-interface techniques in conjunction with a physical mat, in other embodiments at least some of the operations in the user-interface techniques may be performed by electronic device 110-1 and/or computer 120 without a physical mat. Instead, in some embodiments, the user may place one or more objects on an arbitrary surface in the environment, may perform one or more gestures, may designate an object or item as associated with a particular command or instruction and then may specify the command or the instruction by may touch, point to or cover up without physical contact the designated object or item, etc. Thus, in some embodiments, at least some of the operations in the user-interface techniques may be generalized to use with an arbitrary surface without the physical mat. In some embodiments, electronic device 110-1 may project instructions or information associated with the user-interface techniques on an arbitrary surface in the environment (instead of or in addition to displaying the instructions or the information on a display). Alternatively, in some embodiments, electronic device 110-1 may be a portable electronic device, such as smart glasses or an augmented-reality display, and electronic device 110-1 may display the instructions or information on one or more heads-up displays associated with electronic device 110-1.

In some embodiments, one or more of the operations in the user-interface techniques may leverage domain understanding or knowledge associated with a different application (in the same of a different market segment). This may facilitate cross-domain understanding. For example, domain knowledge may be packaged in an ontology (e.g., represented as collection logical rules), so that it can be shared or reused by multiple applications. Moreover, one or more of the operations in the user-interface techniques, such as business logic or the one or more inspection criteria, may be provided by a third party, which is different from the user or a provider of the user-interface techniques.

In this way, the user-interface technique may allow the user to, in general, remotely and efficiently interact with electronic device 110-1 without requiring physical contact with electronic device 110-1 or the use of a voice-based interface. These capabilities may provide additional degrees of freedom that may allow a user to use electronic device 110-1 to, e.g., identify, analyze (such count), etc. one or more objects, even in applications where physical contact with electronic device 110-1 is inconvenient, difficult or impossible. Consequently, the user-interface techniques may improve the user experience when interacting with or using electronic device 110-1.

Note that the application may be used in or relevant to a variety of fields or market segments, including: medicine or surgery, aviation, industrial maintenance, inspection, verification, car maintenance, defense or military, remote experts, customer relationship management, retail, sales, etc.

Figure 2:
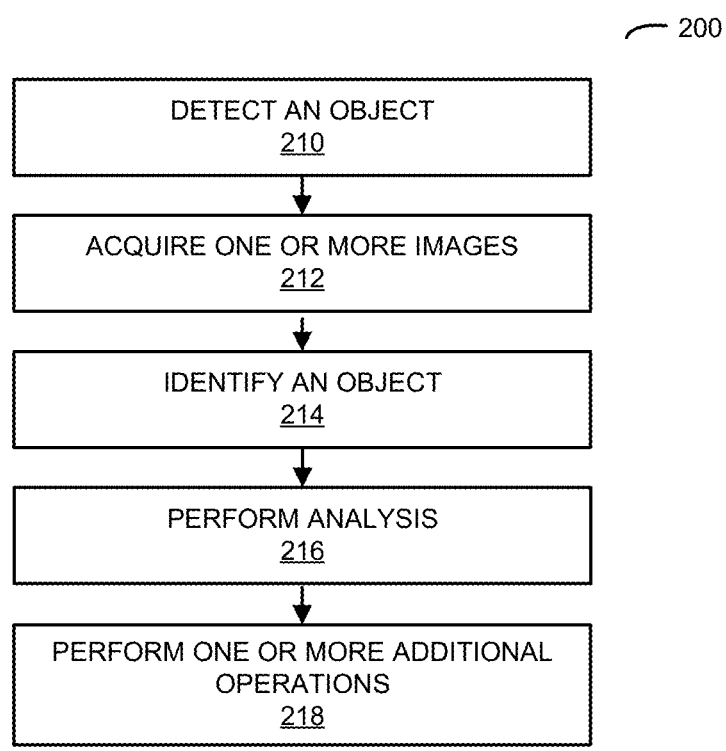
FIG. 2 is a flow diagram illustrating an example of a method for performing analysis using an electronic device in FIG. 1 in accordance with an embodiment of the present disclosure.

We now describe embodiments of the method. FIG. 2 presents a flow diagram illustrating an example of a method 200 for performing analysis using an electronic device, such as electronic device 110-1 in FIG. 1.

During operation, the electronic device may detect an object (operation 210) in a predefined spatial region of a physical mat, where the physical mat is disposed on a surface that is separate from the electronic device. For example, the object may be a surgical instrument. Note that the predefined spatial region may be specified by multiple predefined markers on the physical mat. Moreover, a given image in the one or more images may include information associated with at least three of the predefined markers. Furthermore, a given predefined marker may have a unique spatial pattern relative to remaining predefined markers on the physical mat. Additionally, the predefined markers may provide a color reference in different or a wide variety of lighting conditions.

In response, the electronic device may acquire one or more images (operation 212) of the object using one or more image sensors in the electronic device. Then, the electronic device may identify the object (operation 214) based at least in part on the one or more images, where the identification involves the use of a pretrained neural network or a pretrained machine-learning model that uses information associated with the one or more images as an input and that outputs information specifying the identified object. Note that the identification may involve understanding the scene in the one or more images that includes the object (such as the orientation of the object, one or more inspection criteria associated with the object, etc.) and/or verifying the identification (including in noisy or dirty environments, variable lighting conditions, etc.).

Moreover, the electronic device may provide classification information (operation 214) associated with the identified object. Next, the electronic device may perform the analysis (operation 216) associated with the identified object. Note that the analysis may include: incrementing a count of a number of a type of object that includes the identified object; determining a state of the identified object; computing an orientation or a spatial arrangement of the identified object relative to one or more other objects in the predefined spatial region; and/or calculating a numerical value associated with the identified object.

In some embodiments, the electronic device optionally performs one or more additional operations (operation 218). For example, identifying the object may involve: providing the one or more images to a computer; and receiving object information from the computer, where the object information corresponds to or specifies the identified object. Alternatively, identifying the object may involve determining the object information by performing image analysis on the one or more images.

Moreover, the electronic device may: determine two or more predefined objects that are potential matches for the identified object; provide information specifying the two or more predefined objects; and detect that a user touched, pointed to or covered up without physical contact one or more of a set of predefined icons in a second predefined spatial region of the physical mat to select one of the two or more predefined objects. Note that a given predefined icon is associated with a given command or instruction, and the classification information may be associated with the selected one of the two or more predefined objects.

Furthermore, the electronic device may detect a gesture of the user that specifies at least a portion of the identified object, and the one or more images may include at least the specified portion of the identified object based at least in part on the detected gesture. For example, the gesture may correspond to two fingers on one or both hands of the user. In some embodiments, the electronic device may perform optical character recognition on at least the specified portion of the identified object.

Additionally, when a second object is detected in a second predefined spatial region of the physical mat, the electronic device may: acquire one or more second images of the second object using the one or more image sensors; identify the second object based at least in part on the one or more second images; and perform analysis associated with the identified second object. For example, the identified object in the predefined spatial region may include an available surgical instrument, the identified second object in the second predefined spatial region may include a used surgical instrument, and the analysis may include maintaining a count of available surgical instruments and/or used surgical instruments.

In some embodiments, the electronic device may provide a report with results of the analysis may store information with the results of the analysis.

In some embodiments of method 200, there may be additional or fewer operations. Furthermore, the order of the operations may be changed, and/or two or more operations may be combined into a single operation. While some of the preceding embodiments may involve feedback or information received from a user, in other embodiments one or more of these operations may be automated, i.e., performed without human action.

Figure 3:
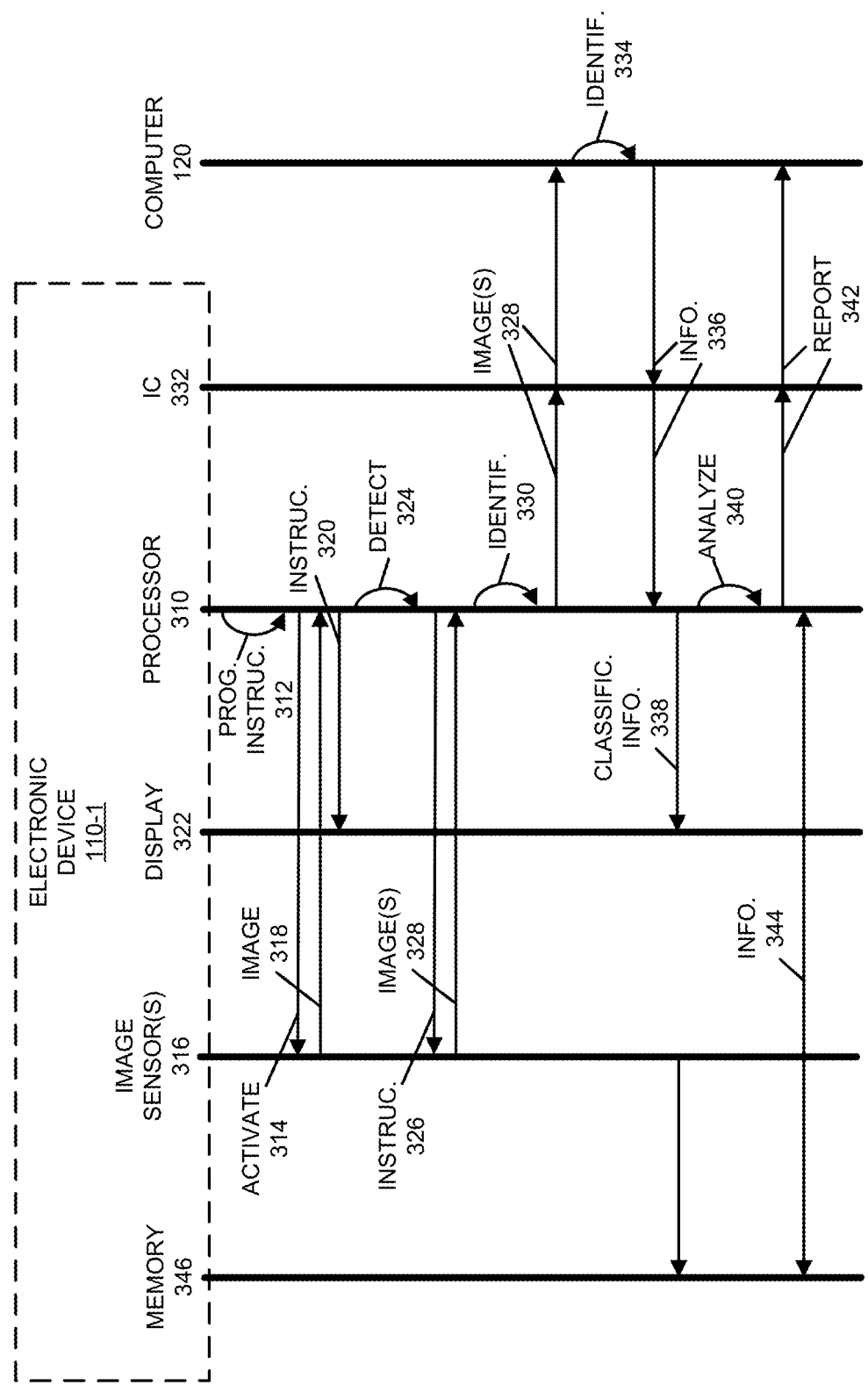
FIG. 3 is a drawing illustrating an example of communication among an electronic device and a computer in FIG. 1 in accordance with an embodiment of the present disclosure.

FIG. 3 presents a drawing illustrating an example of communication among electronic device 110-1 and computer 120. During operation, processor 310 in electronic device 110-1 may execute program instructions 312. In response, processor 310 may activate 314 one or more image sensors 316 in electronic device 110-1 and may receive an image 318 of a current field of view (FOV) of at least one of the one or more image sensors 316. Moreover, processor 310 may display instructions 320 on display 322 in electronic device 110-1.

Then, in response to detecting 324 an object in the current FOV of at least the one of the one or more image sensors 316 (such as in a predefined spatial region of a physical mat), processor 310 may instruct 326 the one or more image sensors 316 to acquire one or more images 328 of the object. Moreover, processor 310 may identify 330 at least the object based at least in part on analysis of the one or more images 328. The identification may be performed by processor 310. Alternatively or additionally, processor 310 may provide the one or more images 328 to computer 120 using interface circuit (IC) 332 in electronic device 110-1. In response, computer 120 may perform identification 334 and may provide information 336 that specifies at least the object to interface circuit 332, which then provides information 336 to processor 310.

Next, processor 310 may provide classification information 338 associated with the identified object to display 322 in electronic device 110-1 for display. Moreover, processor 310 may perform analysis 340 associated with the identified object. For example, the analysis may include: incrementing a count of a number of a type of object that includes the identified object; determining a state of the identified object; computing an orientation or a spatial arrangement of the identified object relative to one or more other objects in the predefined spatial region; and/or calculating a numerical value associated with the identified object.

Moreover, processor 310 mat instruct interface circuit 332 to provide a report 342 with results of analysis 340 to computer 120. Alternatively or additionally, processor 310 may store information 344 with results of analysis 340 in memory 346 in electronic device 110-1.

While FIG. 3 illustrate communication between components using unidirectional or bidirectional communication with lines having single arrows or double arrows, in general the communication in a given operation in this figure may involve unidirectional or bidirectional communication.

We now further describe embodiments of the user-interface techniques. A spatial tasks platform that addresses the challenges of physical constraints on the use or placement of electronic devices and/or difficulty or inability to interact with a user interface on an electronic device is described. The spatial tasks platform may be implemented by an electronic device (such as a cellular telephone, a computer, a laptop, a tablet, etc.), a projector and one or more image sensors (such as a camera, a 3D or depth camera, a CMOS image sensor, a CCD image sensor, etc.). However, in some embodiments, the spatial tasks platform is implemented at least in part by a remote (e.g., cloud-based computer or server). Note that at least some of the components in the spatial tasks platform may be discrete and electronically interconnected, or may be integrated into a single electronic device. In sterile or hostile environments, the components in the spatial tasks platform may be included or contained in a housing (such as a plexiglass housing), which can be cleaned or sterilized as needed, and/or which can withstand chemical or biological exposure in an environment external to the housing.

During operation, the electronic device may provide electrical signals corresponding to a user interface to the projector. Then, the projector may display the user interface onto an arbitrary surface that is located a distance from the projector and the image sensor. For example, the electronic device, the projector and the image sensor may be mounted on a stand. Alternatively or additionally, the electronic device may display the user interface on a display in the electronic device and/or on a display associated with the electronic device. In some embodiments, the electronic device may not project or display the user interface. Instead, the user interface may, at least in part, by embodied in a physical mat that is used in conjunction with the electronic device. However, in other embodiments, the electronic device may dynamically display or project information on at least a portion of the physical mat, such as in a predefined spatial region.

The user interface (in the physical mat or on an arbitrary surface) may include different predefined spatial regions, which may be indicated by visual cues, such as a displayed border (e.g., a rectangular or a square box) or one or more predefined markers. A given predefined spatial region may be associated with one or more functions. For example, an object placed in a first predefined spatial region may be identified using an image-processing technique based at least in part on one or more images that are acquired by the one or more image sensors. When an object is identified, the user interface may display a label, a tag or a name of the object (and, more generally, classification information and/or metadata) proximate to the object in the first predefined spatial region or whenever the object is placed on a surface within an outer border of the user interface (which may initiate at least a portion of the operations in the user-interface techniques). Alternatively or additionally, when the object is identified, the electronic device may display (separately from the user interface) a label, a tag or a name of the object.

If there is ambiguity about the identity of an object (such as two possible surgical tools), the electronic device may display two or more possible labels or names of the object proximate to the object in the first predefined spatial region with an interrogative (such as a question mark) and/or may display the two or more possible labels or names of the object on a display in or associated with the electronic device. Then, a user may select the correct identity by touching the surface proximate or on top off one of the two or more possible labels. Alternatively or additionally, the user may touch the surface proximate or on top off one or more predefined icons corresponding to commands or instructions that allow the user to navigate through the two or more possible labels or names and to select the correct identity.

In the user interface, a second predefined spatial region may optionally include a set of dynamic instructions, such as a sequential list of operations to be performed. The set of dynamic instructions may be updated as a user completes a particular task. For example, the electronic device may remove or cross out completed tasks from the displayed set of dynamic instructions. In addition, a current task or operation in the set of dynamic instructions may be highlighted, underlined, displayed with a difference color and/or displayed with a different size from a remainder of the set of dynamic instructions. Alternatively or additionally, a visual indicator or graphical icon may be displayed proximate to the current task or operation, such as a bounding box around the current task or operation.

The user interface may optionally include a third predefined spatial region that may be used to count a number of objects, either within the third predefined spatial region at a given time or cumulatively during a time interval as the objects are placed (over time) with the third predefined spatial region. For example, a user may place one or more identified (and, thus, labeled) objects (such as objects that were previously placed in the first spatial region and then identified) in the third predefined spatial region, and the number of objects may be determined using a second image-processing technique (which may be the same as or different from the image-processing technique that is used in conjunction with the first predefined spatial region). Note that different types of objects may be placed within the third predefined spatial region concurrently or sequentially, and the spatial tasks platform may determine the counts for the different types of objects. Thus, a physician's assistant may place different types of surgical instruments in the third predefined spatial region during a surgical procedure, and the spatial tasks platform may determine the number of each type of surgical instrument. In some embodiments, the current count of different types of surgical instruments may be displayed on the surface in the user interface, such as along a top edge of the user interface.

Additionally, the user interface may include a fourth predefined spatial region where a user can place a physical object (such as a die in a particular orientation) that signifies a predefined command or instruction. The image sensor may acquire one or more images of the physical object and a third image-processing technique (which may be the same as or different from the image-processing technique and/or the second image-processing technique) may be used to analyze the one or more images to determine the predefined command or instruction. Then, the user interface may be adapted or modified based at least in part on the predefined command or instruction. For example, the predefined command may modify one or more functions associated with one or more of the spatial regions in the user interface. Alternatively or additionally, the fourth predefined spatial region may include one or more predefined icons that are associated with different commands or instructions.

Note that different predefined spatial regions may use different sensors. For example, a counting spatial region may use a depth image sensor or camera. Alternatively or additionally, a defect detection spatial region may use a high-resolution image sensor or camera focused on a particular area in the user interface.

In some embodiments, the physical object includes a die with different graphical patterns on difference faces of the die. The graphical patterns may be easy to see and orthogonal to each other to reduce or eliminate errors by the user or the spatial tasks platform. Moreover, a given graphical pattern may correspond to a given predefined command, which may be determined by the spatial tasks platform by analyzing one or more images of the given graphical pattern using an image-processing technique or optical character recognition. By manipulating the object so that the particular graphical pattern is on the top face of the die, a user may use the die to indicate a particular predefined command to the spatial tasks platform.

Moreover, the user may be able to dynamically interact with the user interface in the spatial tasks platform in any of the aforementioned ways and/or using other techniques. For example, the user may provide a verbal command that is received by a microphone associated with the electronic device. The resulting electrical signals may be analyzed using a voice-recognition technique (such as natural language processing) to determine the verbal command or instruction. Alternatively or additionally, a user may wear different colored bands on the wrist, and by pointing to a given one of the colored bands, the user may specify a given command to the spatial tasks platform. In some embodiments, a user may interact with the user interface by performing gestures or, more generally, via a human-electronic device interface.

Furthermore, the electronic device may execute a companion application or program instructions associated with the user interface. This application may aggregate information associated with the user interface. For example, the companion application may record a video of the user interface during a time interval, which can be selectively replayed (in whole or in part) during or following the time interval. Alternatively or additionally, the companion application may collect information about the identified objects, the number of objects that are counted, commands or instructions that are received, etc., and may generate one or more electronic reports that summarize the collected information. Note that the companion application may provide commands to the spatial task platform, such as by displaying QR codes or 1D or 2D patterns that the spatial task platform captures and interprets by analyzing one or more images.

For example, at the start of a surgical procedure, a user may place available surgical sponges and surgical tools in the first predefined spatial region. These objects may be identified. Then, during the surgical procedure, used surgical sponges and surgical tools may be placed in the third predefined spatial region. After the surgical procedure, the remaining (unused) available surgical sponges and surgical tools may be placed in the third predefined spatial region. The companion application may log the identified objects available and the count of used and unused objects, may confirm the no objects are missing, and may generate and provide an electronic report summarizing this information. In some embodiments, the analysis performed by the companion application may be based at least in part on expected results or one or more inspection criteria (such as an expected count or expected positions of different types of objects). Note that the companion application may provide feedback that is displayed in the user interface and/or on a display associated with the electronic device, such as an update to a current task or operation displayed in the second predefined spatial region, such as: successfully completed, an error message, etc. Alternatively or additionally, the electronic report may indicate tasks that were completed, as well as any errors or error events that were identified.

Thus, the spatial tasks platform may provide a flexible augmented reality user interface. Note that, in the present discussion, 'augmented reality' is an interactive experience of a real-world environment in which objects that reside in the real-world are enhanced or supplemented by computer-generated information. For example, the computer-generated information may include perceptual information, such as visual, auditory, haptic, somatosensory or olfactory information. Alternatively or additionally, the computer-generated information may include descriptions or analysis of the objects in the real-world environment. The computer-generated information may be presented concurrently with a user's experience of the real-world environment and/or may be stored for subsequent use by the user.

While the preceding discussion illustrated the user interface as having different predefined spatial regions with associated functionality, in other embodiments the user interface may include fewer or more predefined spatial regions. For example, two or more predefined spatial regions may be combined into a single predefined spatial region. Alternatively, a single predefined spatial region may be divided into two or more predefined spatial regions with associated functions.

Moreover, while the preceding discussion illustrated the predefined spatial regions in the user interface with particular functions, more generally the functions associated with at least some of the spatial regions may be associated with one or more inspection criteria.

The augmented reality application may be used in or relevant to a variety of fields or market segments, including: medicine or surgery, aviation, industrial maintenance, inspection, verification, car maintenance, defense or military, remote experts, customer relationship management, retail, sales, etc. For example, the augmented reality application may be used to: identify surgical or medical tools in a tray to confirm the correct number, placement, type of tools, that the tools are clean, etc.; to verify that the tools are laid out/correctly assembled; to determine which tools were used during a surgery; and/or to perform a real-time inventory (such as to count the number of tools on a tray or in a drawer).

In some embodiments, the 'spatial or environment understanding' in the augmented reality application (e.g., analyzing an image to determine relationships among objects and environment composition) may depend on 'localization.' This may involve creating a 3D coordinate system of the world (such as on the surface on which the user interface is displayed or on a surface of a physical mat) and locating the image sensor as well as the detected objects in this coordinate system. In some embodiments, such localization may be facilitated using fiducial markers and/or SLAM. Moreover, in order to perform spatial or scene understanding, objects in an image may be localized. Then, the objects detected and classified in the image may be registered to the 3D world. SLAM may facilitate this operation because it provides a map of 3D points, which can correspond to objects. While this may be performed with the markers, the markers may provide additional capabilities, such as finding or identifying planes in the world: by sticking markers on tables, walls and floors; recovering the scale as a ratio of mark size, which may be known a priori; and estimating white balance from calibrated marker colors. Alternatively, in embodiments with a physical mat, the physical mat may include predefined icons or markers for one or more of these purposes or functions. These capabilities may allow an affine transformation to be created, which may map image points to 3D points on planes in the world.

In general, the type of localization used may depend on the capabilities of an electronic device. For example, if an image sensor is available, and the image sensor moves, visual SLAM may be used. Alternatively, with a depth-sensitive image sensor, depth SLAM (which uses the depth camera to create a 3D voxel view of the world) may be used. Alternatively, if an electronic device includes a gyroscope and an accelerometry, their outputs may be combined and visual-inertial SLAM (which uses the accelerometer and gyroscope to track movement, using the image sensor to correct for drift) to be used.

We now describe embodiments of a gesture that a user may use to specify at least a portion of an object that is of interest. FIG. 4 presents a drawing illustrating an example of gesture-based capture of an image of at least a portion 412 of an object 410. Notably, the gesture may involve two fingers 414 of the user (on the same hand, e.g., a thumb and an index finger or a thumb and a pinky finger, or on different hands, e.g., both index fingers) that are separated by a distance 416. This gesture may specify or indicate at least the portion 412 of object 410. In response, an electronic device may capture or acquire one or more images of at least the portion 412 of object 410.

In addition, to specifying at least a portion of an object that is of interest, the user may use a gesture to specify at least a portion of an object on which an electronic device (and/or a remote computer) should perform optical character recognition. This is shown in FIG. 5, which presents a drawing illustrating an example of gesture-based capture of an image of at least a portion 512 of text 510. Notably, the user may use a gesture (e.g., with two fingers) to specify text in a document for analysis. This approach may allow the user to a point and capture a subset of the text on the document.

We now describe embodiments of the physical mat. FIGS. 6-9 present drawings illustrating examples of physical mats 600 (FIG. 6), 700 (FIG. 7), 800 (FIG. 8) and 900 (FIG. 9) for use in interacting with an electronic device, such as electronic device 110-1 in FIG. 1.

Figure 6:
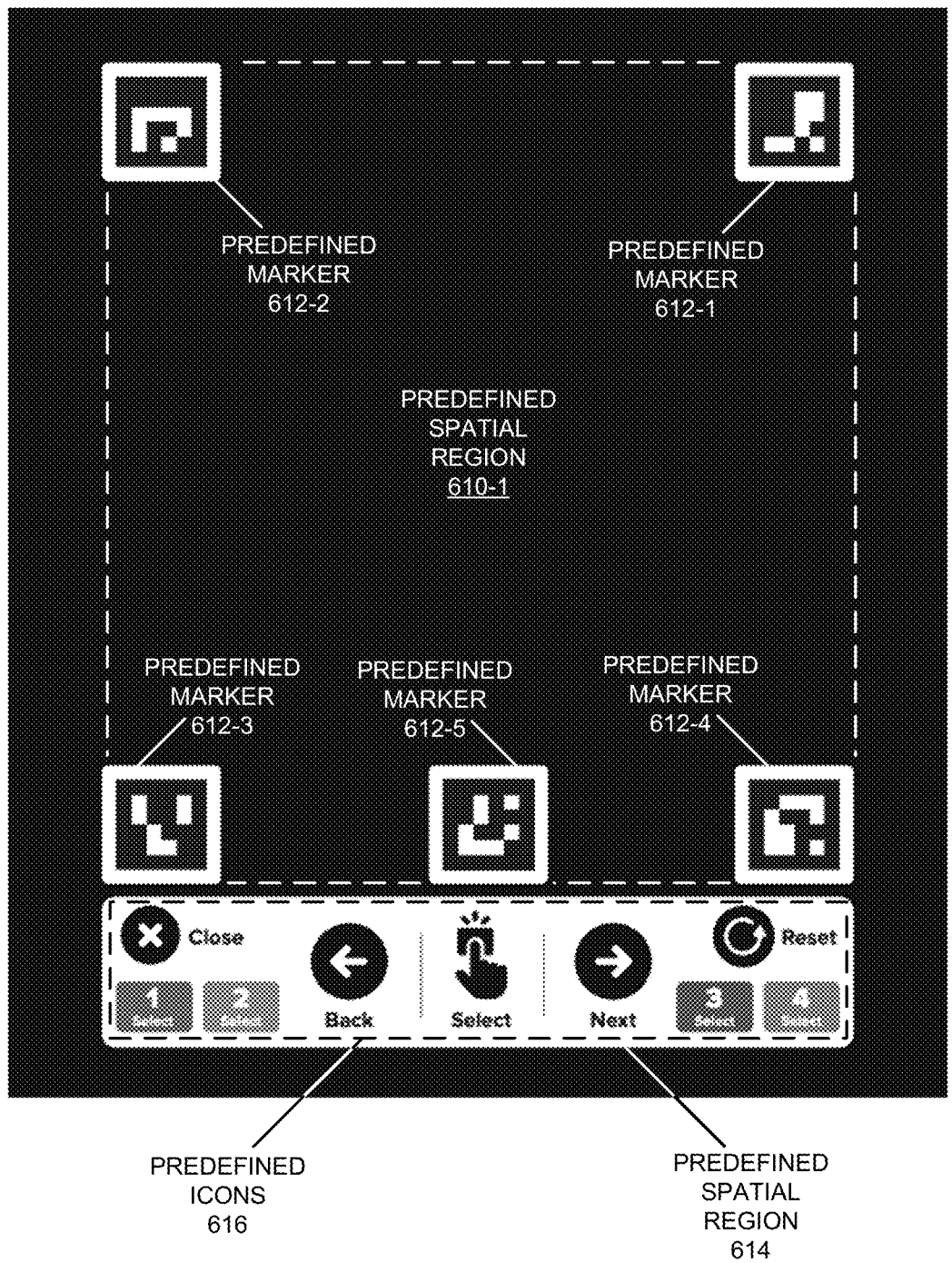
FIG. 6 is a drawing illustrating an example of a physical mat for use in interacting with an electronic device in FIG. 1 in accordance with an embodiment of the present disclosure.
Figure 7:
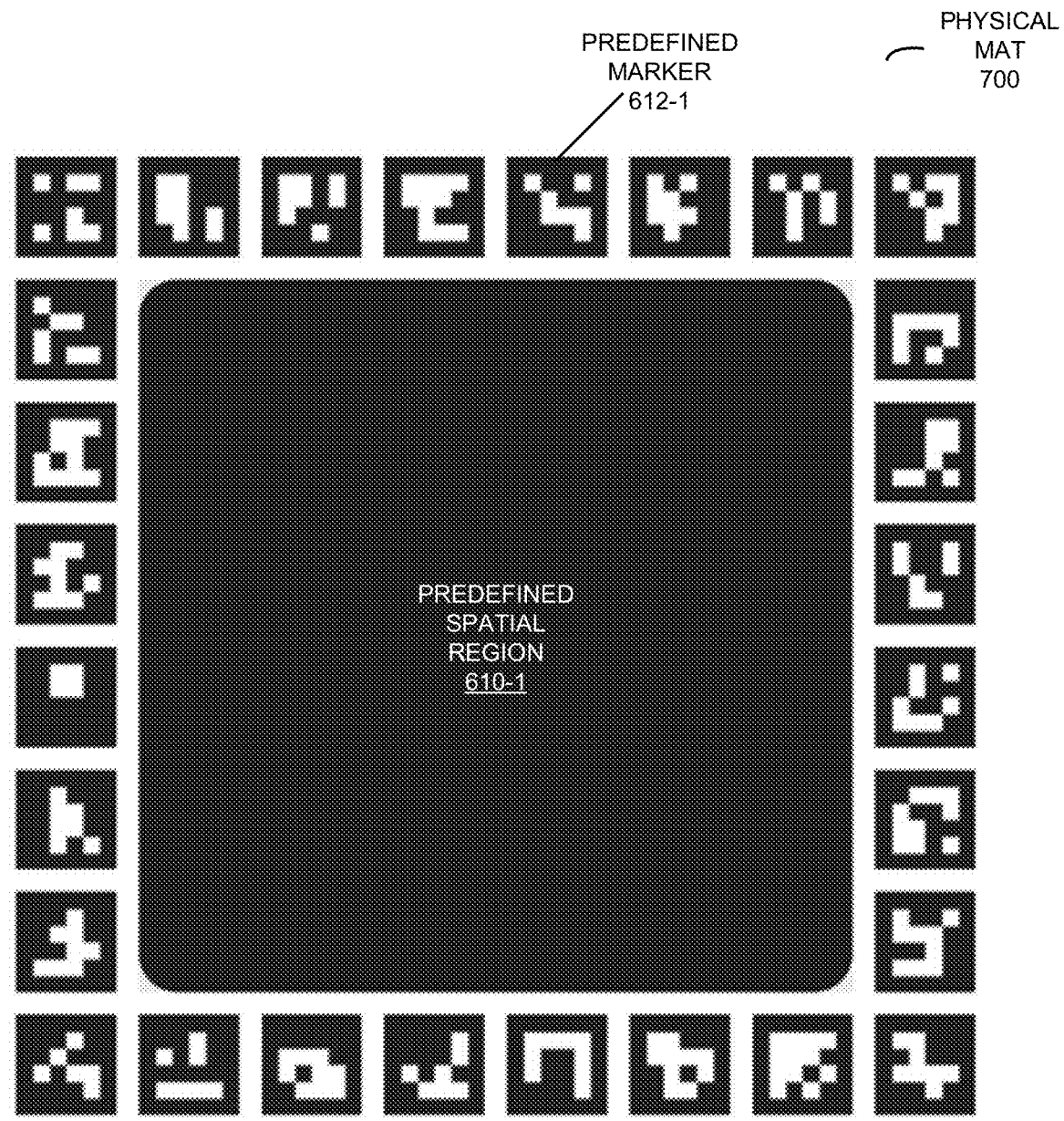
FIG. 7 is a drawing illustrating an example of a physical mat for use in interacting with an electronic device in FIG. 1 in accordance with an embodiment of the present disclosure.

Notably, the physical mats may include one or more predefined spatial regions 610 that are defined or specified by multiple predefined markers 612 arranged at least along a boundary or a periphery of a given predefined spatial region. In FIG. 6, four of predefined markers 612 are located at corners of predefined spatial region 610-1. In addition, physical mat 600 may include a fifth predefined marker 612-5, which may help ensure that a given image of an object in predefined spatial region 610-1 includes at least three predefined markers 612. This is because a user may tend to place a surgical instrument or a tool between predefined markers 612-1 and 612-2 at an angle to the left or right (or towards predefined marker 612-3 or 612-4). Predefined marker 612-5 is located in the middle of the boundary of predefined spatial region 610-1, so that in these use cases a third predefined marker is included in an image of the surgical instrument or the tool.

Figure 8:
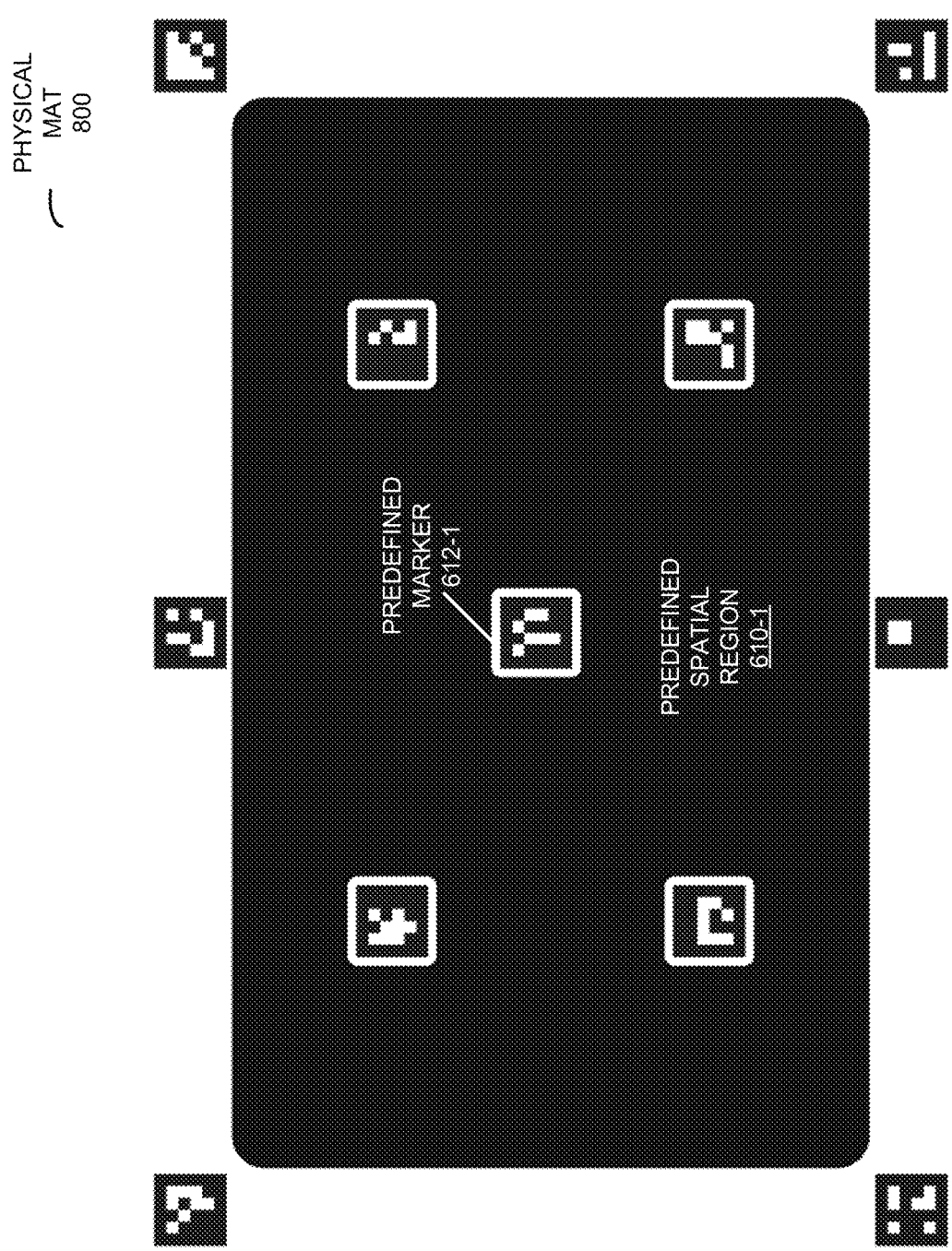
FIG. 8 is a drawing illustrating an example of a physical mat for use in interacting with an electronic device in FIG. 1 in accordance with an embodiment of the present disclosure.
Figure 9:
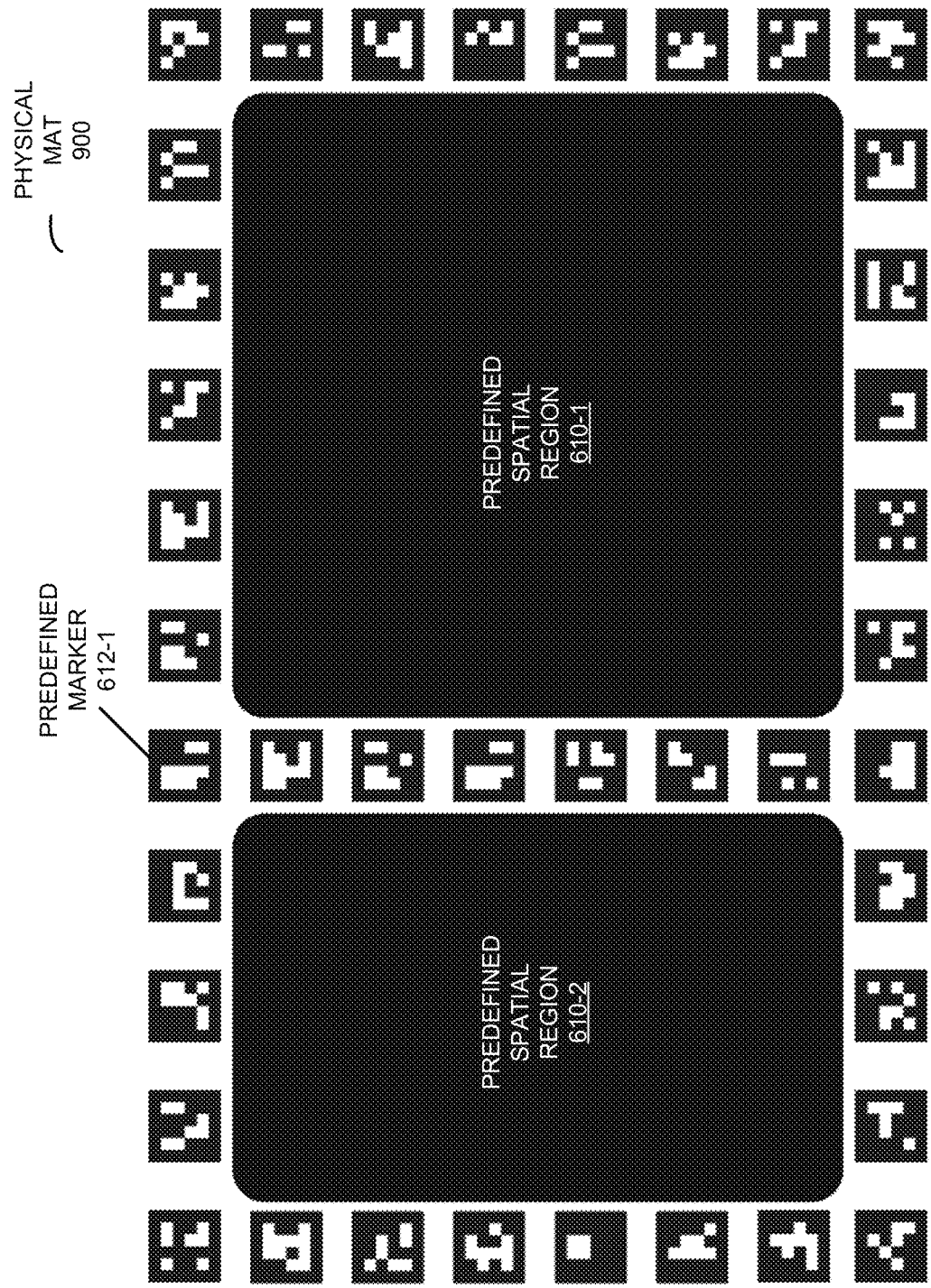
FIG. 9 is a drawing illustrating an example of a physical mat for use in interacting with an electronic device in FIG. 1 in accordance with an embodiment of the present disclosure.

As shown in FIG. 8, in some embodiments some predefined markers (such as predefined marker 612-1) are also include within predefined spatial region 610-1. This configuration may allow predefined markers that are partially covered in an image to be ignored. Moreover, as shown in FIG. 9, in some embodiments different predefined spatial regions 610 may have or may be associated with different functions, such as counting available surgical instruments in predefined spatial region 610-1 and counting used or unavailable surgical instruments in predefined spatial region 610-2. Alternatively, predefined spatial regions 612-1 and 612-2 may provide different work zones for use with large and small surgical instruments. Furthermore, as shown in FIGS. 8 and 9, some of the physical mats may have a different aspect ratio (such as an aspect ration corresponding to an A3 paper size) that are intended for use with projectors.

Note that predefined markers 612 may facilitate: accurate measurements, and/or calibrating a 'white' color in a scene, even when the lighting conditions (intensity, orientation, etc.) varies. Moreover, the use of a dark background in the physical mats may protect delicate surgical instruments and may avoid shiny reflections in an environment with bright lights. Alternatively or additionally, the dark background in FIGS. 6-9 may provide high contrast that may allow objects, such as medication or pills, to be identified and tracked.

In some embodiments, predefined markers 612 include markers that each have a unique and maximally identifiable pattern relative to the remaining markers. More generally, predefined markers 612 may include two-dimensional (2D) matrix barcodes or data matrices (such as QR codes) or another type of 2D pattern that facilitates easy identification of predefined markers 612.

Moreover, predefined markers 612 may provide reference points that allow the distance to one or more image sensors in an electronic device to be determined. For example, pairs of predefined markers 612 may provide an absolute distance reference of 25 mm.

While predefined markers 612 in FIGS. 6-9 are visible to the human eye (i.e., in a visible band of frequencies), in other embodiments predefined markers 612 may reflect and/or absorb light in an infrared band of frequencies and/or an ultraviolet band of frequencies. Alternatively, in embodiments where the one or more image sensors include a 3D camera or can acquire 3D or depth information, a physical mat may not include predefined markers 612.

Moreover, while FIGS. 6-9 illustrate the physical mats with static information (such as predefined markers 612), in other embodiments at least a portion of the information on a physical mat may be dynamic. For example, an electronic device may project information on the physical mat. Alternatively, the physical may include or may be a display. This dynamic capability may allow the user interface to be adapted or changed based at least in part on user actions or a current state in an companion application.

As shown in FIG. 6, in some embodiments physical mat 600 includes a predefined spatial region 614 with multiple predefined icons 616 that are associated with different commands or instructions. A user may point to a particular predefined icon and an electronic device may identify the user's finger in an image and based at least in part on its location on physical mat 600 may trigger or initiate a command or an instruction. In some embodiments, the user may need to point at the particular predefined icon for at least a time interval (such as 0.3 s) in order for the command or the instruction to be triggered or initiated. However, in embodiments where the one or more image sensors can acquire depth information or infrared information, the time interval may be reduced. Note that an electronic device may display predefined icons 612 and the corresponding commands or instructions while the user interacts with or specifies one or more of predefined markers 612 in predefined spatial region 614.

The user interaction with predefined icons 616 is shown in FIGS. 10-12, which present drawings illustrating examples of displayed information on an electronic device corresponding to user interaction, via a physical mat, with a companion application on the electronic device, such as electronic device 110-1 in FIG. 1. Notably, a user may interact spatially with a physical mat in order to control an electronic device that is non-invasively monitoring the user's actions. In this way, controlling the electronic device may be incorporated into the user experience with the physical mat, which may be convenient and efficient for the user.

When an object is placed in a predefined spatial region in a physical mat (objects outside the predefined spatial region may be ignored), the electronic device may automatically acquire one or more images or may automatically perform a scan. Moreover, the electronic device may display an instruction, such as 'Place the object', 'Flip the object' or 'Open the object.'

The electronic device may then identify a set of potential matches for the object. These may be displayed on a display. By pointing to or covering up different predefined icons 616 (such as 'next' or 'back'), the user may navigate through the set of potential matches. Then, the user may point or cover up a 'select' predefined icon (such as predefined icon 616-1) to select or specify a particular predefined object (and associated classification information) that corresponds to the object. Alternatively, as shown in FIG. 11, if the user points to or covers up an 'information predefined icon (such as predefined icon 616-2) more information about one of the potential matches is displayed (as shown in FIG. 12). In these ways, the user may control the electronic device in a structured way without physically touching or contacting a surface of the electronic device. Note that when the user points to or covers up a particular predefined icon, the corresponding displayed predefined icon on a display of the electronic device may be highlighted.

While the preceding embodiments illustrated the physical mats with particular predefined spatial regions 610 and 614, predefined markers 612, predefined icons 616, configurations and functionality, in other embodiments there may be different features (such as fewer, more or different predefined spatial regions 610 and 614, predefined markers 612 and/or predefined icons 616), configurations and/or functionality. Moreover, the physical mats may be used in conjunction with different companion applications on the electronic device. Thus, the predefined icons 616 and the corresponding commands or instructions may be different for other companion applications and, thus, based at least in part on business logic associated with a given companion application.

We now describe embodiments of an electronic device, which may perform at least some of the operations in the user-interface techniques. FIG. 13 presents a block diagram illustrating an example of an electronic device 1300, such as access point 112, base station 116, computer 120 and/or one of electronic devices 110-1. This electronic device includes processing subsystem 1310, memory subsystem 1312, and networking subsystem 1314. Processing subsystem 1310 includes one or more devices configured to perform computational operations. For example, processing subsystem 1310 can include one or more microprocessors, ASICs, microcontrollers, programmable-logic devices, one or more graphics process units (GPUs) and/or one or more digital signal processors (DSPs).

Memory subsystem 1312 includes one or more devices for storing data and/or instructions for processing subsystem 1310 and networking subsystem 1314. For example, memory subsystem 1312 can include dynamic random access memory (DRAM), static random access memory (SRAM), and/or other types of memory. In some embodiments, instructions for processing subsystem 1310 in memory subsystem 1312 include: one or more program modules or sets of instructions (such as program instructions 1322 or operating system 1324), which may be executed by processing subsystem 1310. Note that the one or more computer programs may constitute a computer-program mechanism. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310.

In addition, memory subsystem 1312 can include mechanisms for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

Networking subsystem 1314 includes one or more devices configured to couple to and communicate on a wired and/or wireless network (i.e., to perform network operations), including: control logic 1316, an interface circuit 1318 and one or more antennas 1320 (or antenna elements). (While FIG. 13 includes one or more antennas 1320, in some embodiments electronic device 1300 includes one or more nodes, such as nodes 1308, e.g., a network node that can be connected or coupled to a network, a connector or a pad that can be coupled to the one or more antennas 1320. Thus, electronic device 1300 may or may not include the one or more antennas 1320.) For example, networking subsystem 1314 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1300 may use the mechanisms in networking subsystem 1314 for performing simple wireless communication between the electronic devices, e.g., transmitting advertising or beacon frames and/or scanning for advertising frames transmitted by other electronic devices as described previously.

Within electronic device 1300, processing subsystem 1310, memory subsystem 1312, and networking subsystem 1314 are coupled together using bus 1328. Bus 1328 may include an electrical, optical, and/or electro-optical connection that the subsystems can use to communicate commands and data among one another. Although only one bus 1328 is shown for clarity, different embodiments can include a different number or configuration of electrical, optical, and/or electro-optical connections among the subsystems.

In some embodiments, electronic device 1300 includes a display subsystem 1326 for displaying information on a display, which may include a display driver and the display, such as a liquid-crystal display, a multi-touch touchscreen, etc.

Electronic device 1300 can be (or can be included in) any electronic device with at least one network interface. For example, electronic device 1300 can be (or can be included in): a desktop computer, a laptop computer, a subnotebook/netbook, a server, a tablet computer, a smartphone, a cellular telephone, a smartwatch, a consumer-electronic device, a portable computing device, a drone, a headset (such as an augmented-reality headset or a virtual-reality headset), a camera (such as a security camera), a camera coupled with deep learning, a depth-sensitive camera (such as a stereoscopic camera, a time-of-flight camera, a camera that uses structured light, etc.), an infrared camera, a smart speaker, a smart doorbell (which may include a camera or an image sensor), smart glasses, a robot, an access point, a transceiver, a router, a switch, communication equipment, a base station, a controller, test equipment, and/or another electronic device.

Although specific components are used to describe electronic device 1300, in alternative embodiments, different components and/or subsystems may be present in electronic device 1300. For example, electronic device 1300 may include one or more additional processing subsystems, memory subsystems, networking subsystems, and/or display subsystems. For example, electronic device 1300 may include one or more sensors in a measurement subsystem 1330. Additionally, one or more of the subsystems may not be present in electronic device 1300. Moreover, in some embodiments, electronic device 1300 may include one or more additional subsystems that are not shown in FIG. 13. Also, although separate subsystems are shown in FIG. 13, in some embodiments some or all of a given subsystem or component can be integrated into one or more of the other subsystems or component(s) in electronic device 1300. For example, in some embodiments program instructions 1322 are included in operating system 1324 and/or control logic 1316 is included in interface circuit 1318.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1314 (or, more generally, of electronic device 1300). The integrated circuit may include hardware and/or software mechanisms that are used for transmitting wireless signals from electronic device 1300 and receiving signals at electronic device 1300 from other electronic devices. Aside from the mechanisms herein described, radios are generally known in the art and hence are not described in detail. In general, networking subsystem 1314 and/or the integrated circuit can include any number of radios. Note that the radios in multiple-radio embodiments function in a similar way to the described single-radio embodiments.

In some embodiments, networking subsystem 1314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet, a Wi-Fi communication protocol and/or a cellular-telephone communication protocol as an illustrative example, in other embodiments a wide variety of communication protocols and, more generally, wired and/or wireless communication techniques may be used. Thus, the user-interface techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the user-interface techniques may be implemented using program instructions 1322, operating system 1324 (such as a driver for interface circuit 1318) or in firmware in interface circuit 1318. Alternatively or additionally, at least some of the operations in the user-interface techniques may be implemented in a physical layer, such as hardware in interface circuit 1318.

In some embodiments, wireless communication between the electronic device and the computer uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Moreover, while the user-interface techniques were illustrated using one or more images, in other embodiments a wide variety of sensor or measurement inputs may be used, such as: a radio-frequency identifier, a weight, audio-based recognition and localization, etc.

While the preceding discussion illustrated the user-interface techniques using a particular application, in other embodiments the user-interface techniques may be used with an augmented-reality or a non-augmented reality application. For example, the user-interface techniques may be used in a batch-style use-case, in which a video feed is captured or streamed for analysis (i.e., an off-line use case, as opposed to a real-time use case). In these embodiments, the video may be processed frame-by-frame, and events may be ordered according to timestamps. Note that an event may be moving an object in the field of view on a physical mat, adding an object to the field of view on a physical mat, removing an object from the field of view on a physical mat, or changing the state of an object. Moreover, a report may be triggered that summarizes the events. For example, in a medical application, where an image sensor observes the physical mat (or a user interface displayed on a physical mat) with medical instruments, an event may be triggered each time an instrument is removed from the physical mat, is used, and/or is added to the tray. The resulting report may summarize when and which instruments were used.

Note that the batch-style use-case may also be used in a real-time monitoring mode. Notably, instead of sending a report at the end, the application may provide an alert while processing frames from the image sensor in real-time. This approach may be used, e.g., in a retail scenario, such as when an image sensor detects that there are no more of a certain high-value item on a shelf and alerts the staff to replenish the item.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the user-interface techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
one or more image sensors configured to selectively acquire one or more images of an external environment that comprises an object;
an interface circuit configured to communicate with a computer;
a processor, coupled to the one or more image sensor, the interface circuit and a memory, configured to execute the program instructions; and
the memory configured to store the program instructions, wherein, when executed by the processor, the program instructions cause the electronic device to perform operations comprising:
when the object is detected in a predefined spatial region of a physical mat or a surface that is separate from the electronic device, acquiring the one or more images of the object using the one or more image sensors, wherein the physical mat is disposed on the surface;
identifying the object based at least in part on the one or more images, wherein the identification comprises the use of a pretrained neural network or a pretrained machine-learning model that uses information associated with the one or more images as an input and that outputs information specifying the identified object;
providing classification information associated with the identified object;
performing analysis associated with the identified object;

determining two or more predefined objects that are potential matches for the identified object;

providing information specifying the two or more predefined objects; and detecting that a user touched, pointed to or covered up without physical contact one or more of a set of predefined icons in a second predefined spatial region of the physical mat or the surface to select one of the two or more predefined objects, wherein a given predefined icon is associated with a given command or instruction, and wherein the classification information is associated with the selected one of the two or more predefined objects.

2. The electronic device of claim 1, wherein the identifying the object comprises one of:

providing the one or more images intended for the computer, wherein the computer is separate from the electronic device; and receiving object information associated with the computer, wherein the object information corresponds to the identified object; or determining the object information by performing image analysis on the one or more images.

3. The electronic device of claim 1, wherein the predefined spatial region is specified by multiple predefined markers on the physical mat or projected on the surface.

4. The electronic device of claim 3, wherein a given image in the one or more images comprises information associated with at least three of the predefined markers.

5. The electronic device of claim 3, wherein a given predefined marker has a unique spatial pattern relative to remaining predefined markers on the physical mat or the surface.

6. The electronic device of claim 3, wherein the predefined markers provide a color reference in different lighting conditions; and wherein the different lighting conditions comprise when the illumination level or direction varies or changes.

7. The electronic device of claim 1, wherein the analysis comprises: incrementing a count of a number of a type of object that includes the identified object; determining a state of the identified object; computing an orientation or a spatial arrangement of the identified object relative to one or more other objects in the predefined spatial region; or calculating a numerical value associated with the identified object.

8. The electronic device of claim 1, wherein the identified object comprises a surgical instrument.

9. The electronic device of claim 1, wherein the operations comprise detecting a gesture of a user that specifies at least a portion of the identified object; and wherein the one or more images comprise at least the specified portion of the identified object based at least in part on the detected gesture.

10. The electronic device of claim 9, wherein the gesture corresponds to two fingers on one or both hands of the user.

11. The electronic device of claim 9, wherein the operations comprise performing optical character recognition on at least the specified portion of the identified object.

12. The electronic device of claim 1, wherein the operations comprise:

when a second object is detected in a second predefined spatial region of the physical mat or the surface, acquiring one or more second images of the second object using the one or more image sensors;

identifying the second object based at least in part on the one or more second images; and performing analysis associated with the identified second object.

13. The electronic device of claim 12, wherein the identified object in the predefined spatial region comprises an available surgical instrument, the identified second object in the second predefined spatial region comprises a used surgical instrument, and the analysis comprises maintaining a count of available surgical instruments and used surgical instruments.

14. The electronic device of claim 1, wherein the operations comprise providing a report with results of the analysis, storing information with the results of the analysis, or both.

15. A non-transitory computer-readable storage medium for use in conjunction with an electronic device, the computer-readable storage medium storing program instructions that, when executed by the electronic device, causes the electronic device to perform operations comprising:

when an object is detected in a predefined spatial region of a physical mat or a surface that is separate from the electronic device, acquiring one or more images of the object using one or more image sensors in the electronic device, wherein the physical mat is disposed on the surface;

identifying the object based at least in part on the one or more images, wherein the identification comprises the use of a pretrained neural network or a pretrained machine-learning model that uses information associated with the one or more images as an input and that outputs information specifying the identified object;

providing classification information associated with the identified object;

performing analysis associated with the identified object;

determining two or more predefined objects that are potential matches for the identified object;

providing information specifying the two or more predefined objects; and detecting that a user touched, pointed to or covered up without physical contact one or more of a set of predefined icons in a second predefined spatial region of the physical mat or the surface to select one of the two or more predefined objects, wherein a given predefined icon is associated with a given command or instruction, and wherein the classification information is associated with the selected one of the two or more predefined objects.

16. The non-transitory computer-readable storage medium of claim 15, wherein the predefined spatial region is specified by multiple predefined markers on the physical mat or projected on the surface, and a given image in the one or more images comprises information associated with at least three of the predefined markers.

17. The non-transitory computer-readable storage medium of claim 15, wherein the analysis comprises: incrementing a count of a number of a type of object that includes the identified object; determining a state of the identified object; computing an orientation or a spatial arrangement of the identified object relative to one or more other objects in the predefined spatial region; or calculating a numerical value associated with the identified object.

18. The non-transitory computer-readable storage medium of claim 15, wherein the operations comprise:

when a second object is detected in a second predefined spatial region of the physical mat or the surface, acquiring one or more second images of the second object using the one or more image sensors;

identifying the second object based at least in part on the one or more second images; and performing analysis associated with the identified second object.

19. A method for performing analysis, comprising:
by an electronic device:
when an object is detected in a predefined spatial region of a physical mat or a surface that is separate from the electronic device, acquiring one or more images of the object using one or more image sensors in the electronic device, wherein the physical mat is disposed on the surface;

identifying the object based at least in part on the one or more images, wherein the identification comprises the use of a pretrained neural network or a pretrained machine-learning model that uses information associated with the one or more images as an input and that outputs information specifying the identified object;

providing classification information associated with the identified object;

performing the analysis associated with the identified object;

determining two or more predefined objects that are potential matches for the identified object;

providing information specifying the two or more predefined objects; and detecting that a user touched, pointed to or covered up without physical contact one or more of a set of predefined icons in a second predefined spatial region of the physical mat or the surface to select one of the two or more predefined objects, wherein a given predefined icon is associated with a given command or instruction, and wherein the classification information is associated with the selected one of the two or more predefined objects.

20. The method of claim 19, wherein the identifying the object comprises one of:

providing the one or more images intended for the computer, wherein the computer is separate from the electronic device; and receiving object information associated with the computer, wherein the object information corresponds to the identified object; or determining the object information by performing image analysis on the one or more images.

* * * * *